(12) United States Patent
Zhao et al.

(10) Patent No.: US 12,270,663 B2
(45) Date of Patent: *Apr. 8, 2025

(54) STATE-BASED AUTONOMOUS-VEHICLE OPERATIONS

(71) Applicant: Uber Technologies, Inc., San Francisco, CA (US)

(72) Inventors: Dennis Zhao, Pittsburgh, PA (US); Sean Chin, San Francisco, CA (US); Molly Castle Nix, San Francisco, CA (US); Eric James Hanson, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/464,351

(22) Filed: Sep. 11, 2023

(65) Prior Publication Data

US 2024/0110795 A1 Apr. 4, 2024

Related U.S. Application Data

(63) Continuation of application No. 17/503,981, filed on Oct. 18, 2021, now Pat. No. 11,781,873, which is a
(Continued)

(51) Int. Cl.
*G01C 21/34* (2006.01)
*B60W 50/14* (2020.01)
(Continued)

(52) U.S. Cl.
CPC ......... *G01C 21/3423* (2013.01); *B60W 50/14* (2013.01); *G05D 1/0088* (2013.01);
(Continued)

(58) Field of Classification Search
CPC .. G01C 21/3423; H04W 4/029; B60W 50/14; B60W 2540/043; B60W 2556/50;
(Continued)

(56) References Cited

U.S. PATENT DOCUMENTS 6,925,381 B2 8/2005 Adamczyk
8,880,270 B1 11/2014 Ferguson et al.
(Continued)

FOREIGN PATENT DOCUMENTS

DE 102014013960 3/2016
EP 3727985 4/2024
(Continued)

OTHER PUBLICATIONS

"U.S. Appl. No. 15/924,865, PTO Response to Rule 312 Communication mailed Oct. 27, 2021", 2 pgs.
(Continued)

*Primary Examiner* — Gertrude Arthur Jeanglaude
(74) *Attorney, Agent, or Firm* — Schwegman Lundberg & Woessner, P.A.

(57) ABSTRACT

The present disclosure is directed to state-based autonomous-vehicle operations. In particular, the methods, devices, and systems of the present disclosure can: determine, based at least in part on one or more actions of a passenger associated with a trip of an autonomous vehicle, a current state of the trip from amongst a plurality of different predefined states of the trip; identify, based at least in part on the current state of the trip, one or more computing devices associated with the passenger; generate, based at least in part on the current state of the trip, data describing one or more interfaces for display by the computing device(s) associated with the passenger; and communicate, to the computing device(s) associated with the passenger, the data describing the interface(s) for display.

20 Claims, 25 Drawing Sheets

Related U.S. Application Data continuation of application No. 15/924,865, filed on Mar. 19, 2018, now Pat. No. 11,187,543.

(60) Provisional application No. 62/630,552, filed on Feb. 14, 2018.

(51) Int. Cl.
| | |
|---|---|
| *G05D 1/00* | (2006.01) |
| *G08G 1/00* | (2006.01) |
| *G08G 1/123* | (2006.01) |
| *H04W 4/029* | (2018.01) |
| *B60K 35/10* | (2024.01) |
| *B60K 35/28* | (2024.01) |
| *B60K 35/80* | (2024.01) |
| *B60W 50/00* | (2006.01) |

(52) U.S. Cl.
CPC ............ *G08G 1/123* (2013.01); *G08G 1/202* (2013.01); *G08G 1/205* (2013.01); *H04W 4/029* (2018.02); *B60K 35/10* (2024.01); *B60K 35/28* (2024.01); *B60K 35/80* (2024.01); *B60K 2360/1438* (2024.01); *B60K 2360/166* (2024.01); *B60K 2360/175* (2024.01); *B60K 2360/566* (2024.01); *B60K 2360/573* (2024.01); *B60W 2050/0082* (2013.01); *B60W 2050/146* (2013.01); *B60W 2540/043* (2020.02); *B60W 2540/215* (2020.02); *B60W 2556/45* (2020.02); *B60W 2556/50* (2020.02)

(58) Field of Classification Search
CPC ..... B60W 2556/45; B60W 2050/0082; B60W 2050/146; G05D 1/0088; G08G 1/123; G08G 1/202; G08G 1/205; B60K 35/28; B60K 35/80; B60K 2360/166; B60K 2360/1438; B60K 35/10; B60K 2360/573; B60K 2360/566; B60K 2360/175
See application file for complete search history.

(56) References Cited

U.S. PATENT DOCUMENTS

| | | |
|---|---|---|
| 9,194,168 B1 | 11/2015 | Lu et al. |
| 10,297,152 B1 | 5/2019 | Patel et al. |
| 10,330,486 B2 * | 6/2019 | Grimm ............ G08G 1/096775 |
| 10,409,926 B2 * | 9/2019 | Mehta ................ G05B 23/0245 |
| 10,640,082 B1 | 5/2020 | Shannon et al. |
| 11,187,543 B2 | 11/2021 | Zhao et al. |
| 11,781,873 B2 | 10/2023 | Zhao et al. |
| 2017/0213164 A1 | 7/2017 | Rainbolt et al. |
| 2017/0369052 A1 | 12/2017 | Nagy et al. |
| 2019/0066409 A1 * | 2/2019 | Moreira da Mota ....................... G07C 5/0808 |
| 2019/0250002 A1 | 8/2019 | Zhao et al. |
| 2022/0034666 A1 | 2/2022 | Zhao et al. |

FOREIGN PATENT DOCUMENTS

| | | |
|---|---|---|
| WO | 2016209595 | 12/2016 |
| WO | 2017087984 | 5/2017 |
| WO | 2019160944 | 8/2019 |

OTHER PUBLICATIONS

"U.S. Appl. No. 15/924,865, Notice of Allowance mailed Jul. 16, 2021", 5 pgs.
"U.S. Appl. No. 15/924,865, Examiner Interview Summary mailed Jun. 25, 2021", 2 pgs.
"U.S. Appl. No. 15/924,865, Non Final Office Action mailed Mar. 22, 2021", 9 pgs.
"U.S. Appl. No. 15/924,865, 312 Amendment filed Oct. 18, 2021".
"International Application Serial No. PCT US2019 017837, International Search Report mailed Jun. 11, 2019", 5 pgs.
"International Application Serial No. PCT US2019 017837, Written Opinion mailed Jun. 11, 2019", 5 pgs.
"U.S. Appl. No. 15/924,865, Response filed Jun. 22, 2021 to Non Final Office Action mailed Mar. 22, 2021", 16 pgs.
"International Application Serial No. PCT US2019 017837, International Preliminary Report on Patentability mailed Aug. 27, 2020", 7 pgs.
"European Application Serial No. 19708718.2, Communication Pursuant to Article 94(3) EPC mailed Mar. 22, 2022", 4 pgs.
"European Application Serial No. 19708718.2, Response to Communication pursuant to Rules 161(1) and 162 EPC filed Feb. 24, 2021", 25 pgs.
"U.S. Appl. No. 17/503,981, Preliminary Amendment filed Oct. 18, 2021", 11 pgs.
"European Application Serial No. 19708718.2, Response filed Aug. 1, 2022 to Communication Pursuant to Article 94(3) EPC mailed Mar. 22, 2022", 46 pgs.
"U.S. Appl. No. 17/503,981, Non Final Office Action mailed Feb. 8, 2023", 8 pgs.
"U.S. Appl. No. 17/503,981, Response filed May 8, 2023 to Non Final Office Action mailed Feb. 8, 2023", 11 pgs.
"U.S. Appl. No. 17/503,981, Notice of Allowance mailed Jun. 2, 2023", 5 pgs.
"U.S. Appl. No. 17/503,981, Supplemental Notice of Allowability mailed Jun. 14, 2023", 2 pgs.
"European Application Serial No. 24170910.4, Extended European Search Report mailed Jul. 22, 2024", 9 pgs.

* cited by examiner

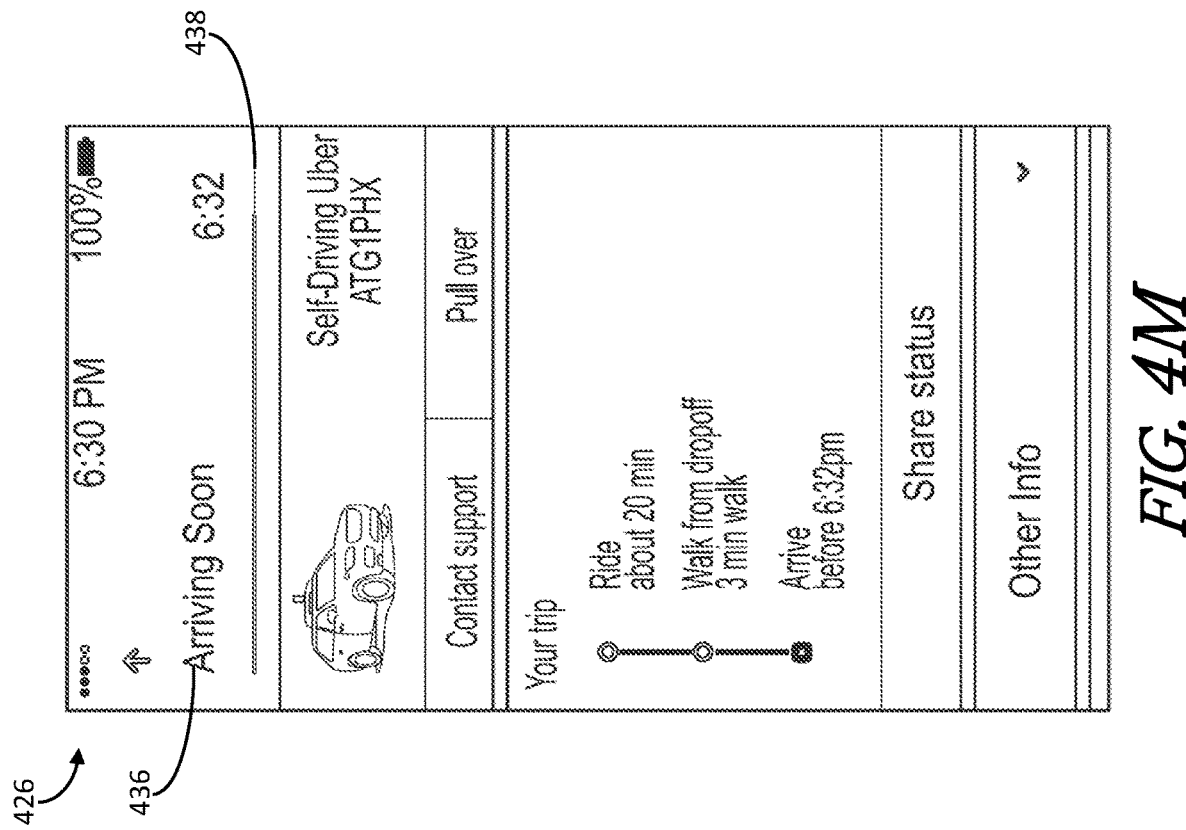

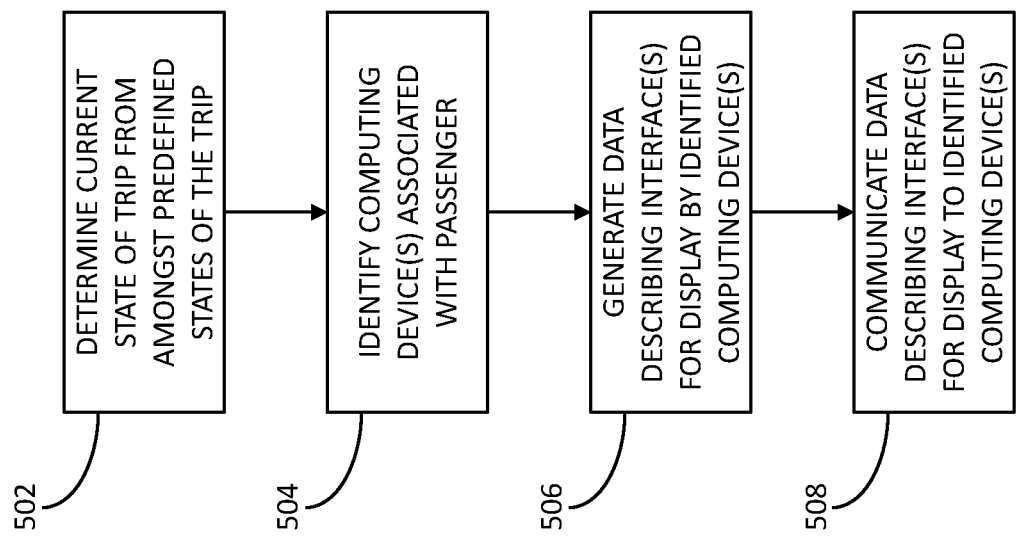

STATE-BASED AUTONOMOUS-VEHICLE OPERATIONS

PRIORITY CLAIM

This application claims priority to U.S. Pat. Application Ser. No. 62/630,552, filed Feb. 14, 2018, and entitled "STATE-BASED AUTONOMOUS-VEHICLE OPERATIONS," the disclosure of which is incorporated by reference herein in its entirety.

FIELD

The present disclosure relates generally to autonomous vehicles. More particularly, the present disclosure relates to state-based autonomous-vehicle operations.

BACKGROUND

An autonomous vehicle is a vehicle that is capable of sensing its environment and navigating with minimal or no human input. In particular, an autonomous vehicle can observe its surrounding environment using a variety of sensors and identify an appropriate path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include determining, by a computing system and based at least in part on one or more actions of a passenger associated with a trip of an autonomous vehicle, a current state of the trip from amongst a plurality of different predefined states of the trip. The method can also include identifying, by the computing system and based at least in part on the current state of the trip, one or more computing devices associated with the passenger. The method can further include generating, by the computing system and based at least in part on the current state of the trip, data describing one or more interfaces for display by the one or more computing devices associated with the passenger. The method can further include communicating, by the computing system and to the one or more computing devices associated with the passenger, the data describing the one or more interfaces for display.

Another example aspect of the present disclosure is directed to a system. The system can include one or more processors and a memory storing instructions that when executed by the one or more processors cause the system to perform operations. The operations can include determining, from amongst a plurality of different predefined states of a trip of an autonomous vehicle, a current state of the trip. The operations can also include generating, based at least in part on the current state of the trip, data describing one or more interfaces for display by one or more computing devices associated with the passenger. The operations can further include communicating, to the one or more computing devices associated with the passenger, the data describing the one or more interfaces for display. The operations can further include receiving, from at least one of the one or more computing devices associated with the passenger, data indicating the passenger has invoked, via at least one of the one or more interfaces, a function of the autonomous vehicle upon which a next state of the plurality of different predefined states of the trip depends. The operations can further include, responsive to receiving the data indicating the passenger has invoked the function of the autonomous vehicle upon which the next state depends: generating, based at least in part on the next state, data describing one or more updated interfaces for display by the one or more computing devices associated with the passenger; and communicating, to the one or more computing devices associated with the passenger, the data describing the one or more updated interfaces for display.

A further example aspect of the present disclosure is directed to one or more non-transitory computer-readable media. The one or more non-transitory computer-readable media can comprise instructions that when executed by one or more computers cause the one or more computers to perform operations. The operations can include determining, based at least in part on one or more actions, of a passenger associated with a trip of an autonomous vehicle, performed via an interface of a first computing device associated with the passenger, a current state of the trip from amongst a plurality of different predefined states of the trip. The operations can also include identifying, based at least in part on the current state of the trip, a second computing device associated with the passenger. The operations can further include generating, based at least in part on the current state of the trip: data describing one or more interfaces for display by the first computing device associated with the passenger, and data describing one or more interfaces for display by the second computing device associated with the passenger. The operations can further include communicating, to the first computing device associated with the passenger, the data describing the one or more interfaces for display by the first computing device associated with the passenger. The operations can further include communicating, to the second computing device associated with the passenger, the data describing the one or more interfaces for display by the second computing device associated with the passenger.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 5 depicts an example method according to example embodiments of the present disclosure.

DETAILED DESCRIPTION

Figure 1:
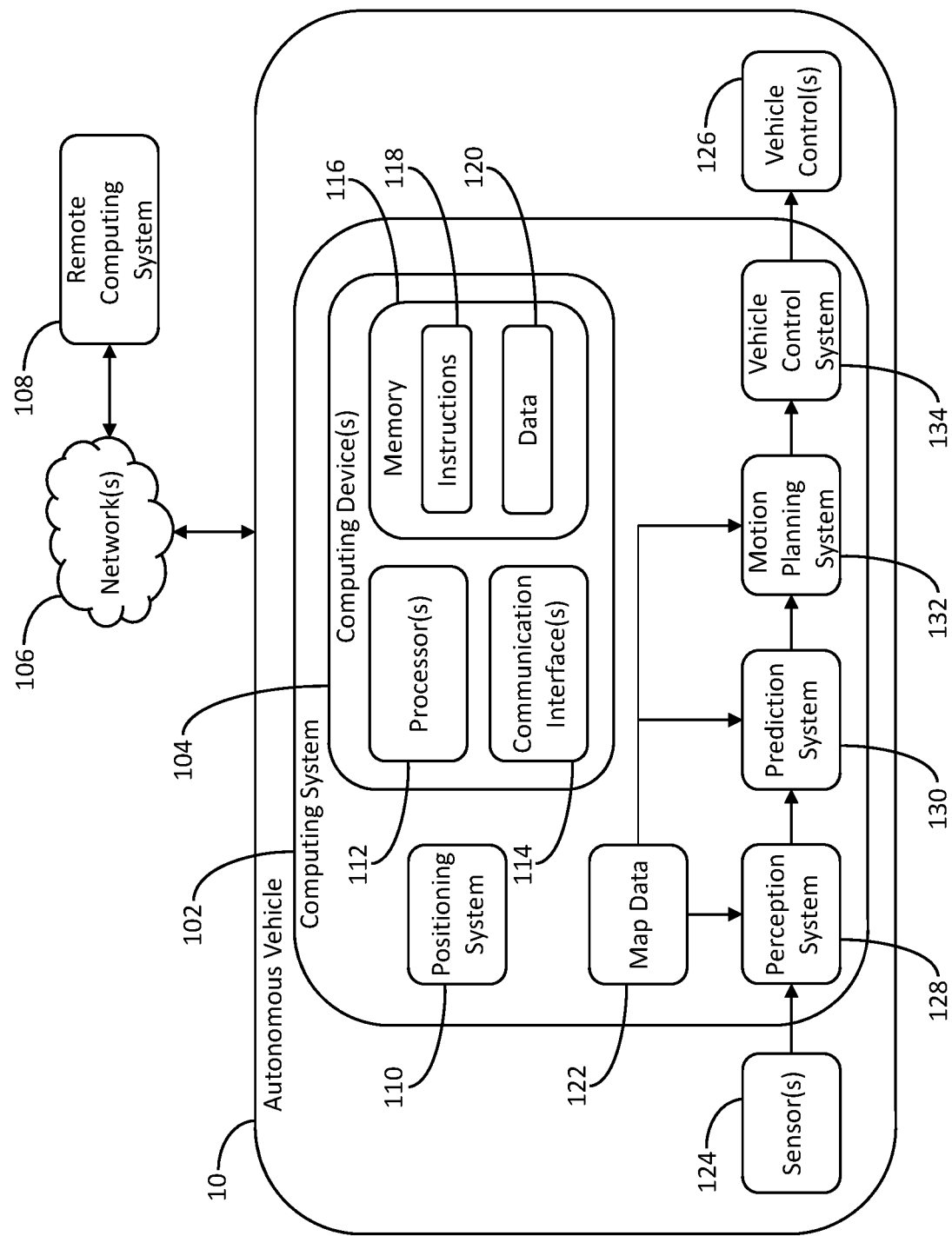
FIG. 1 depicts an example autonomous vehicle according to example embodiments of the present disclosure.

Example aspects of the present disclosure are directed to state-based autonomous-vehicle operations. In particular, a trip of an autonomous vehicle (e.g., a trip from a pickup location of a passenger to a destination of the passenger, and/or the like) can be divided into multiple predefined, finite, and distinct states. For example, each of such states can correspond to a different, distinguishable portion of the trip.

For a given trip associated with a passenger, a computing system can determine, for example, based at least in part on one or more actions of the passenger, a current state of the trip from amongst the various states. The computing system can: identify, based at least in part on the current state, one or more computing devices associated with the passenger; generate, based at least in part on the current state, data describing one or more interfaces for display by the identified computing device(s); and communicate, to the identified computing device(s), the data describing the interface(s) for display.

For example, the various states can include a state corresponding to a requested trip (e.g., a trip requested by the passenger to a specified destination and from a location of the passenger or a pickup location determined by the computing system (e.g., based at least in part on the location of the passenger, data describing the location of the passenger, and/or the like)). Such a state can be characterized by the passenger having requested the trip, the passenger having specified the destination, the computing system having determined the location of the passenger, the computing system having determined a pickup location for the passenger, the computing system having identified an autonomous vehicle for the trip, and/or the like.

Additionally or alternatively, the various states can include a state corresponding to the autonomous vehicle being en route to the location of the passenger, the pickup location for the passenger, and/or the like. Such a state can be characterized by the computing system having identified an autonomous vehicle for the trip, locomotion of the autonomous vehicle along a route from its previous or current location to the location of the passenger, the pickup location for the passenger, and/or the like.

Additionally or alternatively, the various states can include a state corresponding to arrival of the autonomous vehicle at the location of the passenger, the pickup location for the passenger, and/or the like. Such a state can be characterized by the trip having not commenced, the passenger being located outside the autonomous vehicle, entry to the autonomous vehicle being secured (e.g., one or more doors, hatches, trunks, and/or the like of the autonomous vehicle being closed, latched, locked, and/or the like), proximity of the autonomous vehicle to the passenger, the pickup location for the passenger, and/or the like.

Additionally or alternatively, the various states can include a state corresponding to the autonomous vehicle being unlocked for entry by the passenger at the location of the passenger, the pickup location for the passenger, and/or the like. Such a state can be characterized by the trip having not commenced, the passenger being located outside the autonomous vehicle, entry to the autonomous vehicle being unsecured, proximity of the autonomous vehicle to the passenger, the pickup location for the passenger, and/or the like.

Additionally or alternatively, the various states can include a state corresponding to the passenger being located inside the autonomous vehicle and the trip not being ready to commence. Such a state can be characterized by entry to the autonomous vehicle being unsecured (e.g., a door, hatch, trunk, and/or the like of the autonomous vehicle being ajar, unlatched, unlocked, and/or the like), the passenger being unsecured (e.g., unbuckled, and/or the like), the trip having not commenced, the passenger being located inside the autonomous vehicle, and/or the like.

Additionally or alternatively, the various states can include a state corresponding to the passenger being located inside the autonomous vehicle and the trip being ready to commence. Such a state can be characterized by entry to the autonomous vehicle being secured (e.g., one or more doors, hatches, trunks, and/or the like of the autonomous vehicle being closed, latched, locked, and/or the like), the passenger being secured (e.g., buckled, and/or the like), the trip having not commenced, the passenger being located inside the autonomous vehicle, and/or the like.

Additionally or alternatively, the various states can include a state corresponding to the passenger and the autonomous vehicle being en route to the destination of the trip. Such a state can be characterized by the passenger being located inside the autonomous vehicle, locomotion of the autonomous vehicle along a route associated with the trip (e.g., to the destination, from the location of the passenger at which the autonomous vehicle previously arrived, the pickup location for the passenger, and/or the like), the trip having commenced, and/or the like.

Additionally or alternatively, the various states can include a state corresponding to the autonomous vehicle approaching the destination of the trip. Such a state can be characterized by proximity of the autonomous vehicle to the destination of the trip, the passenger being located inside the autonomous vehicle, locomotion of the autonomous vehicle along the route associated with the trip, and/or the like.

Additionally or alternatively, the various states can include a state corresponding to the autonomous vehicle having arrived at the destination of the trip. Such a state can be characterized by arrival of the autonomous vehicle at the destination of the trip, the passenger being located inside the autonomous vehicle, and/or the like.

Additionally or alternatively, the various states can include a state corresponding to the passenger departing from the autonomous vehicle. Such a state can be characterized by arrival of the autonomous vehicle at the destination of the trip, the passenger being located outside the autonomous vehicle, and/or the like.

Additionally or alternatively, the various states can include a state corresponding to the autonomous vehicle departing the destination of the trip. Such a state can be characterized by the passenger being located outside the autonomous vehicle, proximity of the autonomous vehicle to the destination of the trip, locomotion of the autonomous vehicle along a route from the destination of the trip to a new, different location, and/or the like.

Additionally or alternatively, the various states can include a state corresponding to the autonomous vehicle having departed the destination of the trip. Such a state can be characterized by the passenger being located outside the autonomous vehicle, locomotion of the autonomous vehicle along the route from the destination of the trip to the new, different location, and/or the like.

In some embodiments, the autonomous vehicle can include a computing device (e.g., a tablet computer, and/or the like) physically located onboard the autonomous vehicle. Such a computing device can include a display affixed to an interior element of the autonomous vehicle and viewable by the passenger when the passenger is located inside the autonomous vehicle. In some of such embodiments, the computing system can identify (e.g., based at least in part on the determined current state, and/or the like) the computing device physically located onboard the autonomous vehicle as being associated with the passenger (e.g., being presently viewable by the passenger, and/or the like). For example, the computing system can determine (e.g., based at least in part on the determined current state, as part of determining the current state, and/or the like) that the passenger is located inside the autonomous vehicle, and/or the like. Responsive to identifying the computing device physically located onboard the autonomous vehicle as being associated with the passenger, the computing system can: generate, for example, in accordance with one or more parameters of the computing device (e.g., display size, input capabilities, operating system, and/or the like), data describing one or more interfaces based at least in part on the determined current state; and can communicate, to the computing device, the data describing the interface(s) (e.g., for display, and/or the like).

Additionally or alternatively, the passenger can be in possession of a computing device (e.g., a mobile device, smartphone, and/or the like) distinct from the autonomous vehicle. The computing system can identify (e.g., based at least in part on the determined current state, and/or the like) the computing device distinct from the autonomous vehicle as being associated with the passenger (e.g., being presently viewable by the passenger, and/or the like). For example, the computing system can determine (e.g., based at least in part on the determined current state, as part of determining the current state, and/or the like) that the passenger is in possession of the computing device outside the autonomous vehicle, the passenger is in possession of the computing device within a given proximity (e.g., a predetermined radius, and/or the like) of the autonomous vehicle, the passenger is in possession of the computing device inside the autonomous vehicle, and/or the like. Responsive to identifying the computing device distinct from the autonomous vehicle as being associated with the passenger, the computing system can: generate, for example, in accordance with one or more parameters of the computing device (e.g., display size, input capabilities, operating system, and/or the like), data describing one or more interfaces based at least in part on the determined current state; and can communicate, to the computing device, the data describing the interface(s) (e.g., for display, and/or the like).

In some embodiments, the action(s) of the passenger (e.g., based upon which the current state of the trip is at least in part determined, and/or the like) can include one or more physical interactions between the passenger and the autonomous vehicle. Such physical interactions can include, for example, opening a door, hatch, trunk, and/or the like, closing a door, hatch, trunk, and/or the like, locking a door, hatch, trunk, and/or the like, unlocking a door, hatch, trunk, and/or the like, buckling a seatbelt, unbuckling a seatbelt, adjusting a seat position, adjusting a cabin-lighting control, adjusting a cabin-climate control, sitting in a seat, rising from a seat, and/or the like. In some of such embodiments, the computing system can detect one or more of such physical interaction(s) based at least in part on data generated by a door sensor of the autonomous vehicle, a seat-pressure sensor of the autonomous vehicle, a seatbelt sensor of the autonomous vehicle, a camera of the autonomous vehicle located outside the autonomous vehicle, a camera of the autonomous vehicle located inside the autonomous vehicle, a thermal sensor of the autonomous vehicle located outside the autonomous vehicle, a thermal sensor of the autonomous vehicle located inside the autonomous vehicle, and/or the like.

Additionally or alternatively, the action(s) of the passenger (e.g., based upon which the current state of the trip is at least in part determined, and/or the like) can include one or more actions performed via the identified computing device(s) (e.g., the computing device physically located onboard the autonomous vehicle, the computing device distinct from the autonomous vehicle, and/or the like). For example, the computing system can determine, based at least in part on one or more interactions performed via the computing device physically located onboard the autonomous vehicle, that the passenger is located inside the autonomous vehicle. Similarly, the computing system can determine, based at least in part on data received from the computing device distinct from the autonomous vehicle and indicating a location of the passenger, proximity of the passenger to the autonomous vehicle, and/or the like. Based at least in part on the determined proximity, the computing system can determine whether the passenger is located outside the autonomous vehicle, inside the autonomous vehicle, and/or the like.

In some embodiments, the computing system can establish a communication session between the computing device physically located onboard the autonomous vehicle and the computing device distinct from the autonomous vehicle in accordance with a short-range wireless-communication protocol (e.g., Bluetooth, Zigbee, near-field communication, and/or the like). In some of such embodiments, the computing system can: communicate at least one of the interface(s) for display to the computing device distinct from the autonomous vehicle via the communication session; receive, from the computing device distinct from the autonomous vehicle and via the communication session, data indicating that the passenger has invoked (e.g., via one or more of the interface(s), and/or the like) a function of the autonomous vehicle; and/or the like. In some embodiments, the computing system can determine the current state of the trip based at least in part on establishment of the communication session, data communicated via the communication session, a strength of a signal associated with the communication session, and/or the like. In some embodiments, establishing the communication session can include: the computing system communicating, to the computing device distinct from the autonomous vehicle, an identifier associated with a signal being emitted by the computing device physically located onboard the autonomous vehicle in accordance with the short-range wireless-communication protocol; the computing system communicating, to the computing device physically located onboard the autonomous vehicle, an identifier associated with a signal being emitted by the computing device distinct from the autonomous vehicle in accordance with the short-range wireless-communication protocol; and/or the like.

In some embodiments, the computing system can determine (e.g., based at least in part on the current state of the trip, and/or the like) a next state of the trip from amongst the various states. In some of such embodiments, one or more of the interface(s) for display can prompt the passenger to take one or more actions to transition from the current state of the trip to the next state of the trip. Additionally or alternatively, the computing system can cause the autonomous vehicle to produce audio prompting the passenger to take such action(s). The action(s) can correspond to one or more functions of the autonomous vehicle upon which the next state depends, and/or the like. For example, such an interface can prompt the passenger to secure or unsecure (e.g., close, open, latch, unlatch, lock, unlock, and/or the like) one or more entry points of the autonomous vehicle (e.g., one or more doors, hatches, trunks, and/or the like). In some embodiments, the computing system can receive (e.g., from the computing device(s), one or more sensors of the autonomous vehicle, and/or the like) data indicating the passenger has taken the action(s). For example, the computing system can receive data indicating the passenger has invoked a function configured to secure or unsecure the entry point(s) of the autonomous vehicle, and/or the like. In some of such embodiments, responsive to receiving the data indicating the passenger has taken the action(s), the computing system can: generate data describing one or more updated interfaces (e.g., based at least in part on the next state of the trip, and/or the like) for display by the computing device(s); communicate the data describing the updated interface(s) to the computing device(s); and/or the like.

In some embodiments, the computing system can adjust, maintain, and/or the like one or more parameters of the autonomous vehicle. Such parameters can be configured to control, for example, lighting inside the autonomous vehicle, climate inside the autonomous vehicle, a seat position of the autonomous vehicle, audio inside the autonomous vehicle, video inside the autonomous vehicle, a visual indicator (e.g., headlight, turn signal, and/or the like) located on the outside of the autonomous vehicle, an audible indicator (e.g., horn, and/or the like) configured to project sound outside the autonomous vehicle, and/or the like. In some of such embodiments, the computing system can adjust, maintain, and/or the like the parameter(s) based at least in part on the determined current state of the trip. For example, responsive to determining that the current state of the trip corresponds to arrival of the autonomous vehicle at the location of the passenger, the pickup location for the passenger, and/or the like, the computing system can adjust the parameter(s) such that a visual indicator located on the outside of the autonomous vehicle, an audible indicator configured to project sound outside the autonomous vehicle, and/or the like signal to the passenger the presence, location, and/or the like of the autonomous vehicle. Additionally or alternatively, responsive to determining that the current state of the trip corresponds to the autonomous vehicle being unlocked for entry by the passenger at the location of the passenger, the pickup location for the passenger, and/or the like, the computing system can adjust the parameter(s) such that lighting inside the autonomous vehicle accommodates entry by the passenger, and/or the like; responsive to determining that the current state of the trip corresponds to the autonomous vehicle approaching the destination of the trip, the computing system can adjust the parameter(s) such that lighting inside the autonomous vehicle, audio inside the autonomous vehicle, video inside the autonomous vehicle, and/or the like signals to the passenger that the destination is being approached; and/or the like.

In some embodiments, the computing system can determine (e.g., based at least in part on a profile associated with the passenger, and/or the like) one or more preferences of the passenger. In some of such embodiments, the computing system can adjust, maintain, and/or the like the parameter(s) of the autonomous vehicle based at least in part on the preference(s) of the passenger, the determined current state of the trip, and/or the like. For example, responsive to determining that the current state of the trip corresponds to the autonomous vehicle being en route to the location of the passenger, the pickup location for the passenger, and/or the like, the computing system can adjust, maintain, and/or the like the parameter(s) such that climate inside the autonomous vehicle, a seat position inside the autonomous vehicle, and/or the like are in accordance with the preference(s) of the passenger. Additionally or alternatively, responsive to determining that the current state of the trip corresponds to the passenger and the autonomous vehicle being en route to the destination of the trip, the computing system can adjust, maintain, and/or the like the parameter(s) such that audio, video, and/or the like inside the autonomous vehicle are in accordance with the preference(s) of the passenger.

In some embodiments, one or more default preferences can be associated with the autonomous vehicle. In some of such embodiments, the computing system can adjust, maintain, and/or the like the parameter(s) of the autonomous vehicle based at least in part on the default preference(s), the determined current state of the trip, and/or the like. For example, responsive to determining that the current state of the trip corresponds to the autonomous vehicle having departed the destination of the trip, the computing system can adjust, maintain, and/or the like the parameter(s) such that audio, video, climate and/or the like inside the autonomous vehicle are in accordance with the default preference(s).

The methods, devices, and systems described herein can provide a number of technical effects and benefits. For example, the methods, devices, and systems described herein can enable a computing system associated with an autonomous vehicle to focus its resources on demands, signals, inputs, and/or the like associated with a particular state of a trip, thereby conserving such resources by reducing the need to monitor, analyze, store, and/or the like data from various systems, devices, sensors, and/or the like of the vehicle, which may have limited applicability given the current state. Similarly, the methods, devices, and systems described herein can identify computing devices, vehicle parameters, vehicle functions, and/or the like relevant to the current state, thus reducing the permutation of possibilities the computing system is required to support, simplifying the passenger experience, and/or the like.

With reference now to the Figures, example embodiments of the present disclosure will be discussed in further detail.

FIG. 1 depicts an example autonomous vehicle according to example embodiments of the present disclosure. Referring to FIG. 1, autonomous vehicle 10 can be capable of sensing its environment, navigating its environment with minimal or no human input, and/or the like. Autonomous vehicle 10 can be a ground-based autonomous vehicle (e.g., car, truck, bus, and/or the like), an air-based autonomous vehicle (e.g., airplane, drone, helicopter, and/or the like), and/or other type of vehicle (e.g., watercraft, and/or the like). Autonomous vehicle 10 can include one or more sensors 124, computing system 102, and one or more vehicle controls 126. Computing system 102 can assist in controlling autonomous vehicle 10. For example, computing system 102 can receive data generated by sensor(s) 124, attempt to comprehend an environment surrounding autonomous vehicle 10 by performing various processing techniques on the data generated by sensor(s) 124, generate, determine, select, and/or the like a motion plan for navigating autonomous vehicle 10 through, within, and/or the like such surrounding environment, and/or the like. Computing system 102 can interface with vehicle control(s) 126 to operate autonomous vehicle 10 (e.g., in accordance with the motion plan, and/or the like).

Computing system 102 can include one or more computing devices 104. Computing device(s) 104 can include circuitry configured to perform one or more operations, functions, and/or the like described herein. For example, computing device(s) 104 can include one or more processor(s) 112, one or more communication interfaces 114, and memory 116 (e.g., one or more hardware components for storing executable instructions, data, and/or the like). Communication interface(s) 114 can enable computing device(s) 104 to communicate with one another, and/or can enable autonomous vehicle 10 (e.g., computing system 102, computing device(s) 104, and/or the like) to communicate with one or more computing systems, computing devices, and/or the like distinct from autonomous vehicle 10 (e.g., computing system 108, and/or the like). Memory 116 can include (e.g., store, and/or the like) instructions 118 and data 120. When executed by processor(s) 112, instructions 118 can cause autonomous vehicle 10 (e.g., computing system 102, computing device(s) 104, and/or the like) to perform one or more operations, functions, and/or the like described herein. Data 120 can include, represent, and/or the like information associated with such operations, functions, and/or the like, data generated by sensor(s) 124, and/or the like.

Computing system 102 can be physically located onboard autonomous vehicle 10, and computing system 108 can be distinct and/or remotely located from autonomous vehicle 10.

One or more networks 106 (e.g., wired networks, wireless networks, and/or the like) can interface autonomous vehicle 10 (e.g., computing system 102, computing device(s) 104, and/or the like) with computing system 108, which can include one or more computing devices analogous to computing device(s) 104, one or more components (e.g., memory, processors, communication interfaces, and/or the like) analogous to those of computing device(s) 104, and/or the like. Irrespective of attribution described or implied herein, unless explicitly indicated otherwise, the operations, functions, and/or the like described herein can be performed by computing system(s) 102 and/or 108 (e.g., by computing system 102, by computing system 108, by a combination of computing systems 102 and 108, and/or the like).

Computing system 102 can include positioning system 110, which can include one or more devices, circuitry, and/or the like for analyzing, approximating, determining, and/or the like one or more geographic positions of autonomous vehicle 10. For example, positioning system 110 can analyze, approximate, determine, and/or the like such position(s) using one or more inertial sensors, triangulations and/or proximities to network components (e.g., cellular towers, WiFi access points, and/or the like), satellite positioning systems, network addresses, and/or the like. Computing system 102 can include perception system 128, prediction system 130, and motion planning system 132, which can cooperate to perceive a dynamic environment surrounding autonomous vehicle 10, generate, determine, select, and/or the like a motion plan for autonomous vehicle 10, and/or the like.

Perception system 128 can receive data from sensor(s) 124, which can be coupled to or otherwise included within autonomous vehicle 10. Sensor(s) 124 can include, for example, one or more cameras (e.g., visible spectrum cameras, infrared cameras, and/or the like), light detection and ranging (LIDAR) systems, radio detection and ranging (RADAR) systems, and/or the like. Sensor(s) 124 can generate data including information that describes one or more locations, velocities, vectors, and/or the like of objects in the environment surrounding autonomous vehicle 10. For example, a LIDAR system can generate data indicating the relative location (e.g., in three-dimensional space relative to the LIDAR system, and/or the like) of a number of points corresponding to objects that have reflected a ranging laser of the LIDAR system. Such a LIDAR system can, for example, measure distances by measuring the interference between outgoing and incoming light waves, measuring the time of flight (TOF) it takes a short laser pulse to travel from a sensor to an object and back, calculating the distance based at least in part on the TOF with respect to the known speed of light, based at least in part on a phase-shift with known wave-length, and/or the like. As another example, a RADAR system can generate data indicating one or more relative locations (e.g., in three-dimensional space relative to the RADAR system, and/or the like) of a number of points corresponding to objects that have reflected a ranging radio wave of the RADAR system. For example, radio waves (e.g., pulsed, continuous, and/or the like) transmitted by such a RADAR system can reflect off an object and return to a receiver of the RADAR system, generating data from which information about the object's location, speed, and/or the like can be determined. As another example, for one or more cameras, various processing techniques, for example, range-imaging techniques (e.g., structure from motion, structured light, stereo triangulation, and/or the like) can be performed to identify one or more locations (e.g., in three-dimensional space relative to the camera(s), and/or the like) of a number of points corresponding to objects depicted in imagery captured by the camera(s).

Perception system 128 can retrieve, obtain, and/or the like map data 122, which can provide information about an environment surrounding autonomous vehicle 10. For example, map data 122 can provide information regarding: the identity and location of different travelways (e.g., roadways, and/or the like), road segments, buildings, other static items or objects (e.g., lampposts, crosswalks, curbing, and/or the like); the location and directions of traffic lanes (e.g., the location and/or direction of a parking lane, turning lane, bicycle lane, and/or the like); traffic control data (e.g., the location and/or instructions of signage, traffic lights, other traffic control devices, and/or the like); other map data providing information that can assist computing system 102 in comprehending, perceiving, and/or the like an environment surrounding autonomous vehicle 10, its relationship thereto, and/or the like.

Perception system 128 can (e.g., based at least in part on data received from sensor(s) 124, map data 122, and/or the like) identify one or more objects proximate to autonomous vehicle 10 and determine, for each of such object(s), state data describing a current state of the object, for example, an estimate of the object's: size/footprint (e.g., as represented by a bounding shape such as a polygon, polyhedron, and/or the like); class (e.g., vehicle, pedestrian, bicycle, and/or the like); current location (also referred to as position), speed (also referred to as velocity), acceleration, heading, orientation, yaw rate; and/or the like. In some embodiments, perception system 128 can determine such state data for each object over a number of iterations, for example, updating, as part of each iteration, the state data for each object. Accordingly, perception system 128 can detect, track, and/or the like such object(s) over time.

Prediction system 130 can receive state data from perception system 128 and can predict (e.g., based at least in part on such state data, and/or the like) one or more future locations for each object. For example, prediction system 130 can predict where each object will be located within the next five seconds, ten seconds, twenty seconds, and/or the like. As one example, an object can be predicted to adhere to its current trajectory according to its current speed. Additionally or alternatively, other prediction techniques, modeling, and/or the like can be used.

Motion planning system 132 can generate, determine, select, and/or the like a motion plan for autonomous vehicle 10, for example, based at least in part on state data of object(s) provided by perception system 128, predicted future location(s) of object(s) provided by prediction system 130, and/or the like. For example, utilizing information about current location(s) of object(s), predicted future location(s) of object(s), and/or the like, motion planning system 132 can generate, determine, select, and/or the like a motion plan for autonomous vehicle 10 that it determines (e.g., based at least in part on one or more operation parameters, and/or the like) best navigates autonomous vehicle 10 relative to the object(s). Motion planning system 132 can provide the motion plan to vehicle control system 134, which can directly and/or indirectly control autonomous vehicle 10 via vehicle control(s) 126 (e.g., one or more actuators, devices, and/or the like that control gas, power flow, steering, braking, and/or the like) in accordance with the motion plan.

Perception system 128, prediction system 130, motion planning system 132, and/or vehicle control system 134 can include logic utilized to provide functionality described herein. Perception system 128, prediction system 130, motion planning system 132, and/or vehicle control system 134 can be implemented in hardware (e.g., circuitry, and/or the like), firmware, software configured to control one or more processors, one or more combinations thereof, and/or the like. For example, instructions 118, when executed by processor(s) 112, can cause autonomous vehicle 10 (e.g., computing system 102, computing device(s) 104, and/or the like) to implement functionality of perception system 128, prediction system 130, motion planning system 132, and/or vehicle control system 134 described herein.

Figure 2:
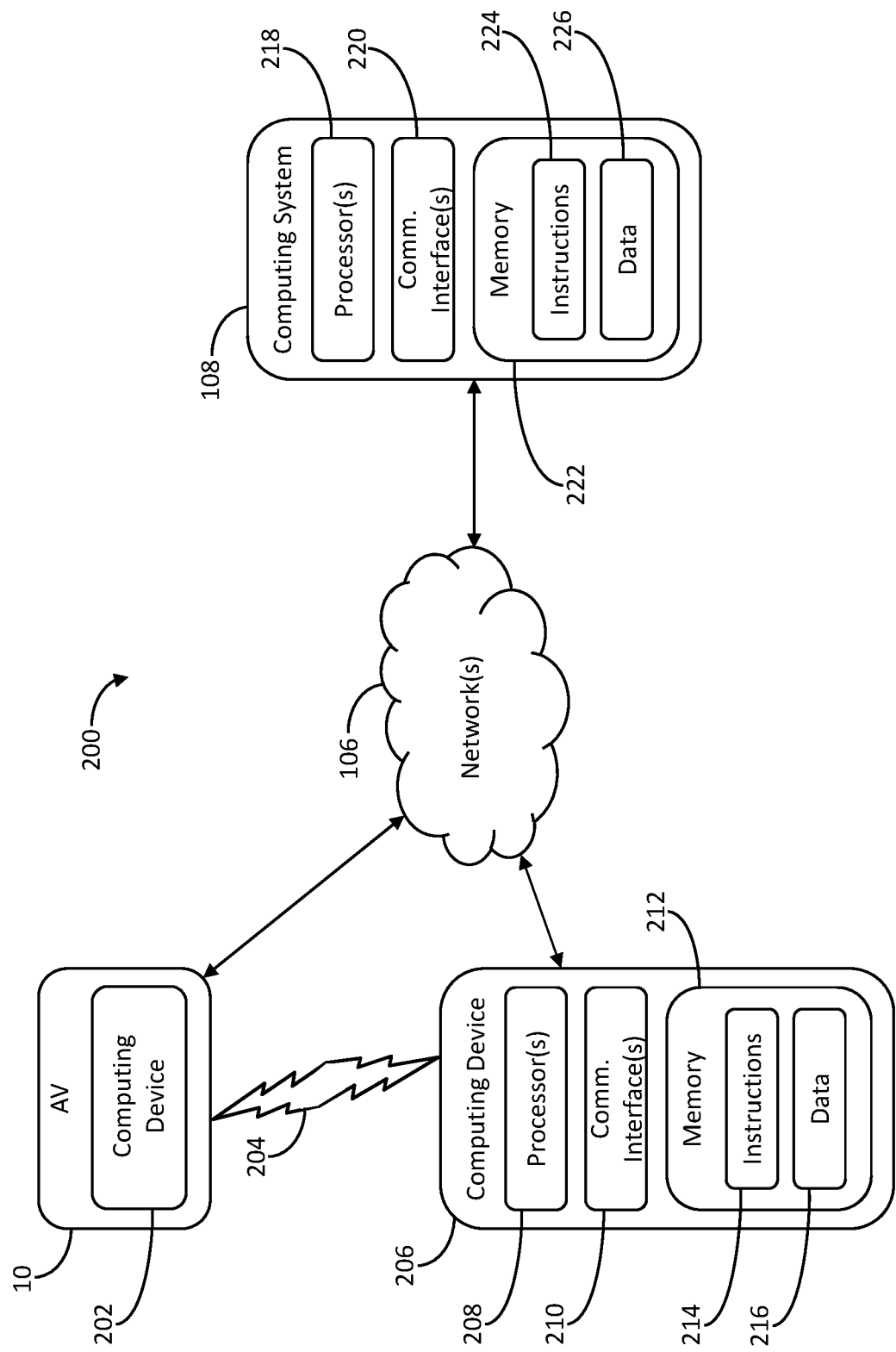
FIG. 2 depicts an example operating environment according to example embodiments of the present disclosure.

FIG. 2 depicts an example operating environment according to example embodiments of the present disclosure. Referring to FIG. 2, environment 200 can include autonomous vehicle 10, computing device 206, network(s) 106, and computing system 108. Autonomous vehicle 10 (e.g., one or more of computing system 102, computing device(s) 104, and/or the like) can include computing device 202 (e.g., a tablet computer, and/or the like) physically located onboard autonomous vehicle 10. Computing device 202 can include a display affixed to an interior element of autonomous vehicle 10 and viewable by a passenger when the passenger is located inside autonomous vehicle 10.

Network(s) 106 can interface autonomous vehicle 10 (e.g., one or more of computing system 102, computing device(s) 104 and/or 202, and/or the like), computing device 206, and/or computing system 108. Communication link 204 can exist between autonomous vehicle 10 (e.g., one or more of computing system 102, computing device(s) 104 and/or 202, and/or the like) and computing device 206, can be established in accordance with a short-range wireless-communication protocol (e.g., Bluetooth, Zigbee, near-field communication, and/or the like), and can interface computing device 206 with autonomous vehicle 10 (e.g., one or more of computing system 102, computing device(s) 104 and/or 202, and/or the like).

Computing device 206 (e.g., a mobile device, smartphone, and/or the like) can be distinct from autonomous vehicle 10. For example, a future, present, or previous passenger of autonomous vehicle 10 can be in possession of computing device 206 (e.g., inside autonomous vehicle 10, outside autonomous vehicle 10, proximate autonomous vehicle 10, distant from autonomous vehicle 10, and/or the like). Computing device 206 can include one or more processor(s) 208, one or more communication interfaces 210, and memory 212 (e.g., one or more hardware components for storing executable instructions, data, and/or the like). Communication interface(s) 210 can enable computing device 206 to communicate (e.g., via network(s) 106, link 204, and/or the like) with autonomous vehicle 10 (e.g., one or more of computing system 102, computing device(s) 104 and/or 202, and/or the like), computing system 108, and/or the like. Memory 212 can include (e.g., store, and/or the like) instructions 214 and data 216. When executed by processor(s) 208, instructions 214 can cause computing device 206 to perform one or more operations, functions, and/or the like described herein. Data 216 can include, represent, and/or the like information associated with such operations, functions, and/or the like.

Computing system 108 can include one or more processor(s) 218, one or more communication interfaces 220, and memory 222 (e.g., one or more hardware components for storing executable instructions, data, and/or the like). Communication interface(s) 220 can enable computing system 108 to communicate (e.g., via network(s) 106, link 204, and/or the like) with autonomous vehicle 10 (e.g., one or more of computing system 102, computing device(s) 104 and/or 202, and/or the like), computing device 206, and/or the like. Memory 222 can include (e.g., store, and/or the like) instructions 224 and data 226. When executed by processor(s) 218, instructions 224 can cause computing system 108 to perform one or more operations, functions, and/or the like described herein. Data 226 can include, represent, and/or the like information associated with such operations, functions, and/or the like.

Irrespective of attribution described or implied herein, unless explicitly indicated otherwise, the operations, functions, and/or the like described herein can be performed by autonomous vehicle 10 (e.g., one or more of computing system 102, computing device(s) 104 and/or 202, and/or the like), computing device 206, and/or computing system 108 (e.g., by autonomous vehicle 10, by computing device 206, by computing system 108, by a combination of one or more of autonomous vehicle 10, computing device 206, computing system 108, and/or the like).

Figure 3A:
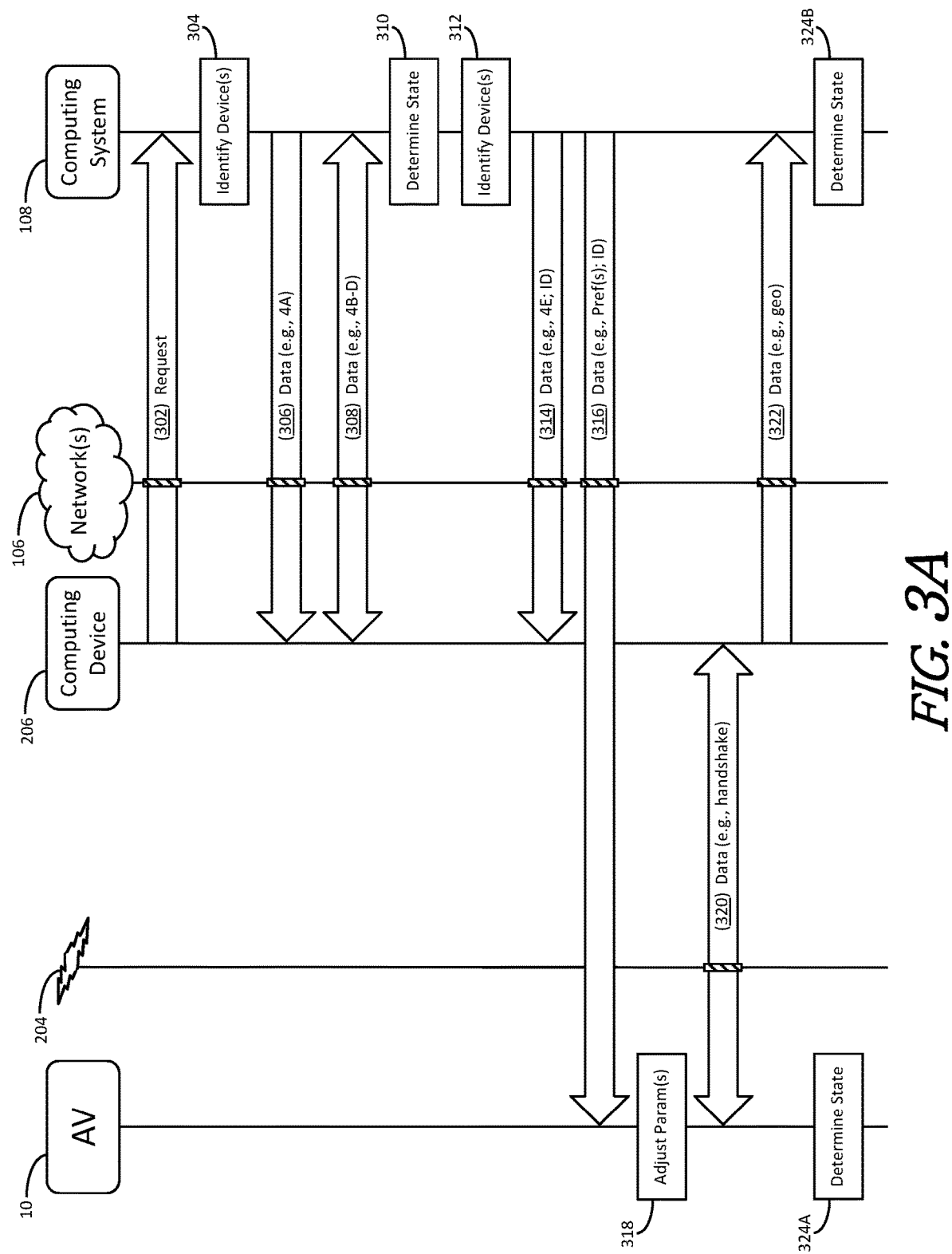
FIGS. 3A-E depict an example event sequence according to example embodiments of the present disclosure.

FIGS. 3A-E depict an example event sequence according to example embodiments of the present disclosure. Referring to FIG. 3A, at (302), computing device 206 can generate a request to initiate a trip and can communicate (e.g., via network(s) 106, as indicated by the cross-hatched box over the line extending downward from network(s) 106, and/or the like) the request to computing system 108, which can receive the request. For example, the passenger in possession of computing device 206 can initiate an application stored on computing device 206 for requesting such a trip, and the application can generate the request. At (304), computing system 108 can identify computing device 206 as being associated with the passenger (e.g., being presently viewable by the passenger, and/or the like). For example, computing system 108 can identify computing device 206 based at least in part on information included in the request (e.g., a passenger identifier associated with the passenger, a device identifier associated with computing device 206, a network address associated with computing device 206, and/or the like). At (306), computing system 108 can generate data describing one or more interfaces for requesting the trip and can communicate such data to computing device 206, which can receive the data and can utilize the data to render the interface(s) for display (e.g., to the passenger, and/or the like). For example, referring to FIG. 4A, computing system 108 can generate, for example, in accordance with one or more parameters of computing device 206 (e.g., display size, input capabilities, operating system, and/or the like), data describing interface 402 for display by computing device 206 and can communicate such data to computing device 206, which can receive the data. As illustrated, interface 402 can include one or more elements for enabling the passenger to specify, clarify, and/or the like their current location, input a destination for the trip, and/or the like.

Returning to FIG. 3A, at (308), computing device 206 can generate (e.g., via the passenger interacting with interface 402, and/or the like) data associated with the trip (e.g., a location of the passenger, a request to specify the destination by street address, and/or the like) and can communicate such data to computing system 108, which can receive the data. Responsive to receiving the data, computing system 108 can generate data describing one or more interfaces (e.g., additional, updated, and/or the like interfaces) for requesting the trip and can communicate such data to computing device 206, which can receive the data and can utilize the data to render the interface(s) for display (e.g., to the passenger, and/or the like). This process of computing device 206 generating data associated with the trip (e.g., responsive to the passenger interacting with the interface(s), and/or the like), communicating such data to computing system 108, and computing system 108 generating data describing one or more interfaces (e.g., additional, updated, and/or the like interfaces) and communicating such data to computing device 206 can occur for multiple iterations.

Figure 4A:
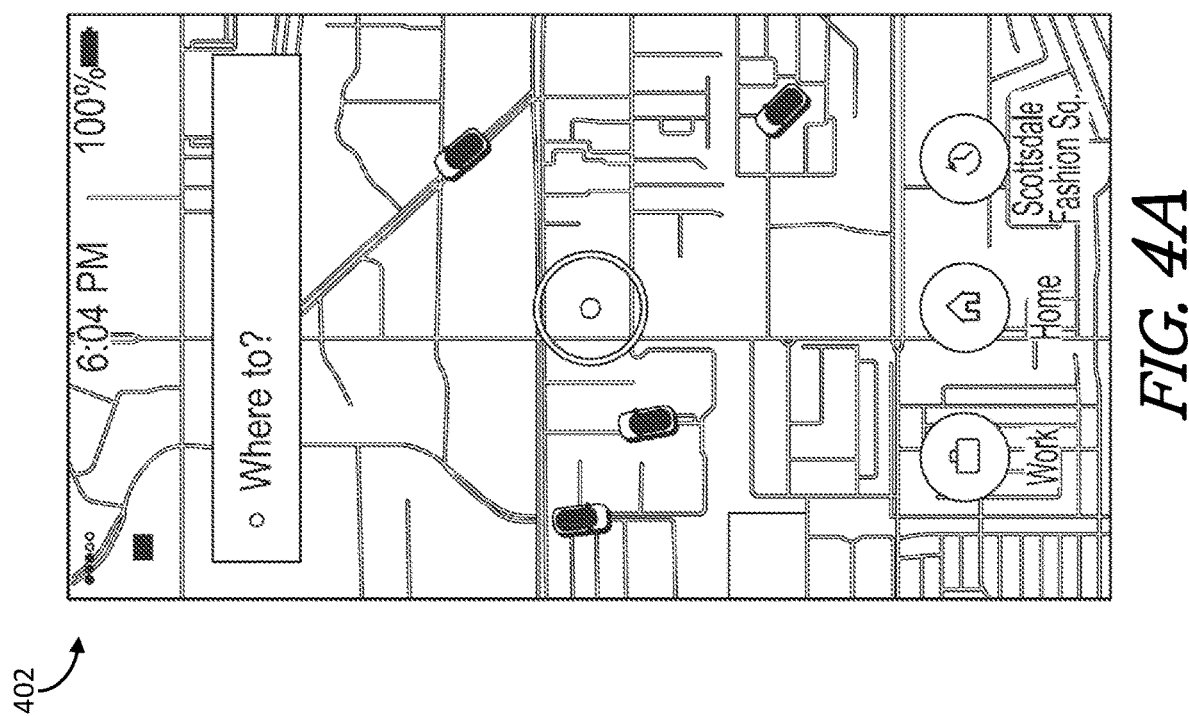
FIGS. 4A-Q depict example interfaces according to example embodiments of the present disclosure.
Figure 4B:
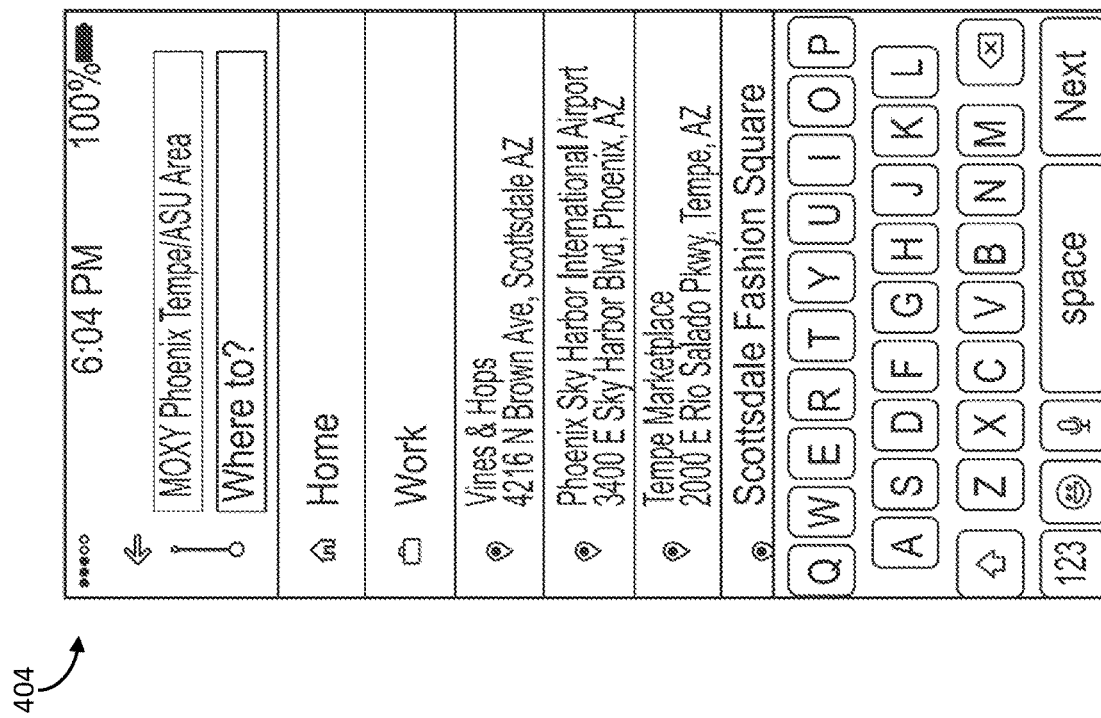

For example, referring to FIG. 4B, computing system 108 can generate, for example, in accordance with one or more parameters of computing device 206 (e.g., display size, input capabilities, operating system, and/or the like), data describing interface 404 for display by computing device 206 and can communicate such data to computing device 206, which can receive the data. As illustrated, interface 404 can include one or more elements for enabling the passenger to specify a destination for the trip (e.g., by inputting a street address, and/or the like). Computing device 206 can generate (e.g., responsive to the passenger interacting with interface 404, and/or the like) data associated with the trip (e.g., identifying the destination, and/or the like) and can communicate such data to computing system 108, which can receive the data.

Figure 4C:
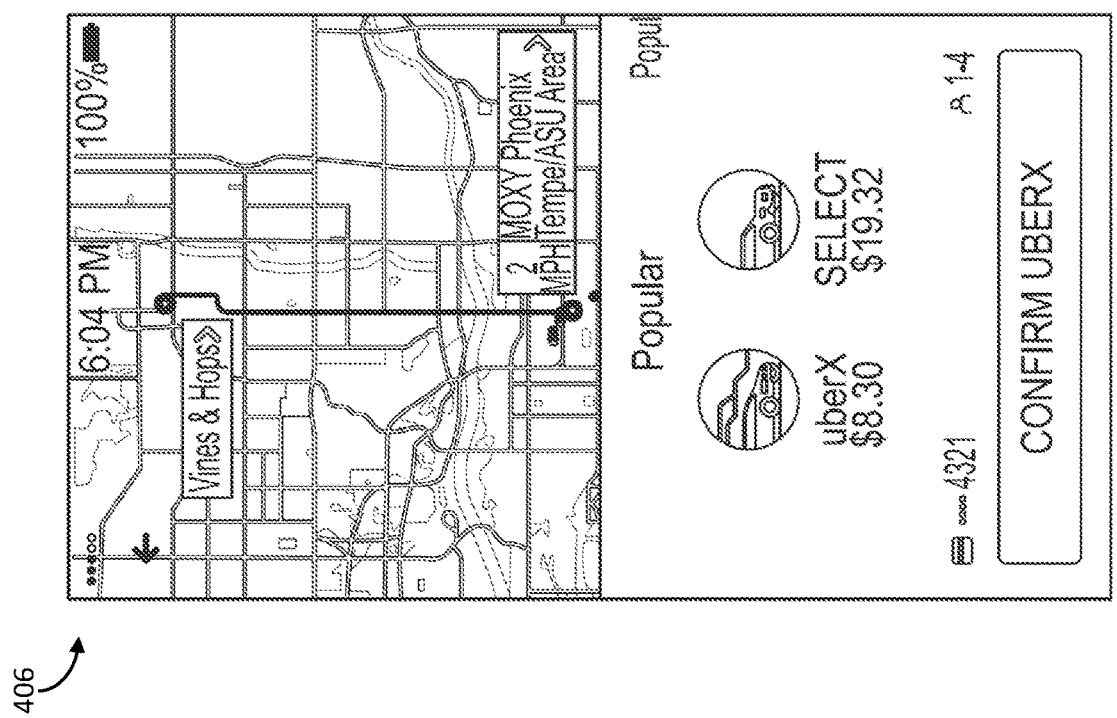

Similarly, referring to FIG. 4C, computing system 108 can generate, for example, in accordance with one or more parameters of computing device 206 (e.g., display size, input capabilities, operating system, and/or the like), data describing interface 406 for display by computing device 206 and can communicate such data to computing device 206, which can receive the data. As illustrated, interface 406 can include one or more elements for enabling the passenger to select a transportation mode for the trip, confirm the trip, and/or the like. Computing device 206 can generate (e.g., responsive to the passenger interacting with interface 406, and/or the like) data associated with the trip (e.g., confirming the trip, and/or the like) and can communicate such data to computing system 108, which can receive the data.

Figure 4D:
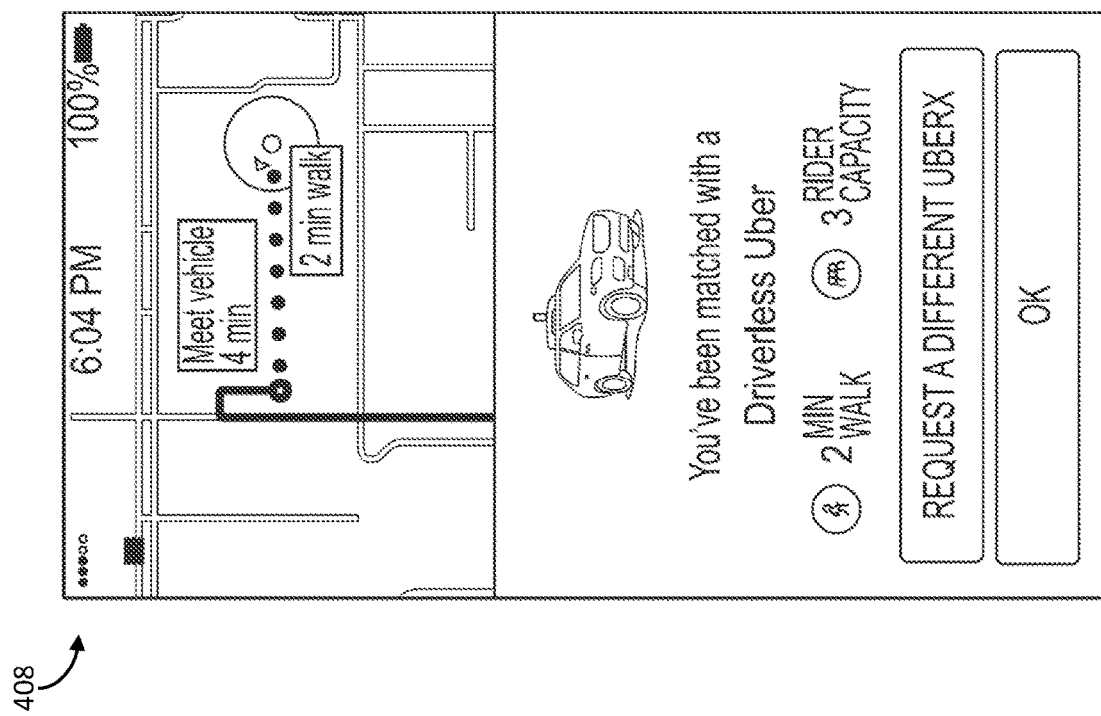

Similarly, referring to FIG. 4D, computing system 108 can generate, for example, in accordance with one or more parameters of computing device 206 (e.g., display size, input capabilities, operating system, and/or the like), data describing interface 408 for display by computing device 206 and can communicate such data to computing device 206, which can receive the data. As illustrated, interface 408 can include one or more elements notifying the passenger that an autonomous vehicle has been selected for the trip, for enabling the passenger to request an alternate mode of transportation for the trip, confirm the trip, and/or the like. Computing device 206 can generate (e.g., responsive to the passenger interacting with interface 408, and/or the like) data associated with the trip (e.g., confirming the trip, and/or the like) and can communicate such data to computing system 108, which can receive the data.

Returning to FIG. 3A, at (310), computing system 108 can determine a current state of the trip from amongst multiple predefined, finite, and distinct states of the trip. For example, computing system 108 can determine that the current state of the trip is a state corresponding to a requested trip (e.g., a trip requested by the passenger to a specified destination and from a location of the passenger or a pickup location determined by computing system 108 (e.g., based at least in part on the location of the passenger, data describing the location of the passenger, and/or the like)). Such a state can be characterized by the passenger having requested the trip, the passenger having specified the destination, computing system 108 having determined the location of the passenger, computing system 108 having determined a pickup location for the passenger, computing system 108 having identified autonomous vehicle 10 for the trip, and/or the like.

Subsequent to determining that the current state of the trip is the state corresponding to the requested trip, computing system 108 can determine that the current state of the trip is a state corresponding to autonomous vehicle 10 being en route to the location of the passenger, the pickup location for the passenger, and/or the like. Such a state can be characterized by computing system 108 having identified autonomous vehicle 10 for the trip, locomotion of autonomous vehicle 10 along a route from its previous or current location to the location of the passenger, the pickup location for the passenger, and/or the like.

At (312), computing system 108 can identify (e.g., based at least in part on the determined current state of the trip, and/or the like) computing device 206 as being associated with the passenger (e.g., being presently viewable by the passenger, and/or the like). For example, computing system 108 can identify computing device 206 based at least in part on information included in the request received from computing device 206, a determination of the passenger's current location, that the passenger is en route (e.g., walking, and/or the like) to a pickup location determined by computing system 108, that autonomous vehicle 10 is en route to the passenger's current location, the determined pickup location, and/or the like.

Figure 4E:
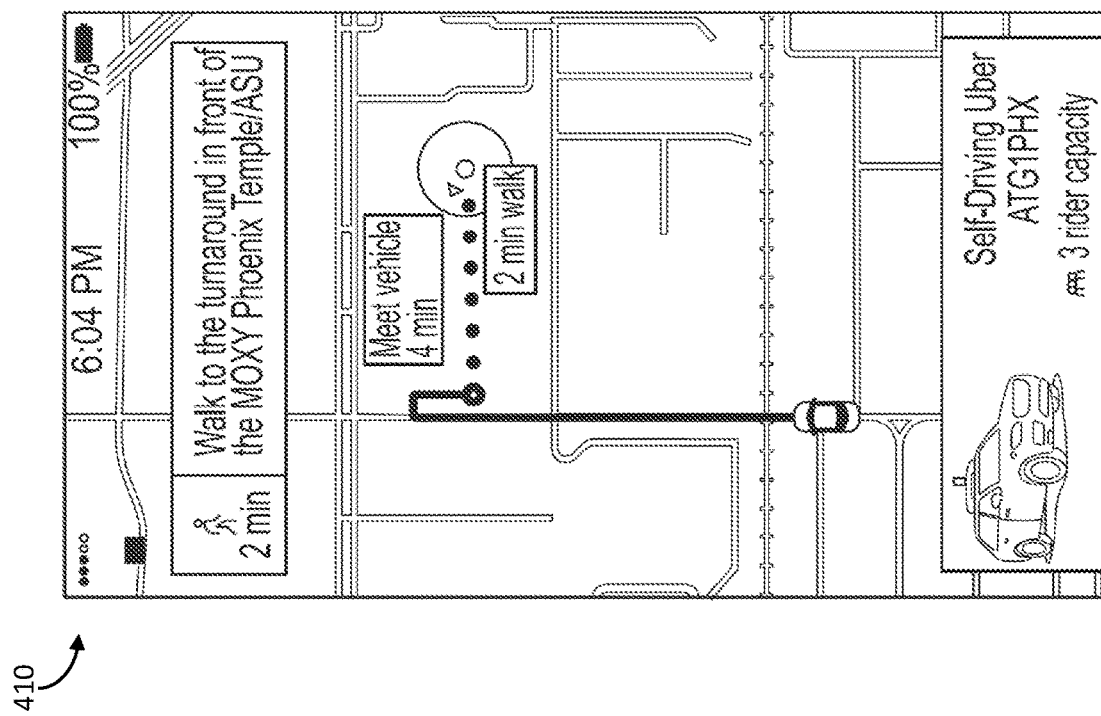

At (314), computing system 108 can generate (e.g., based at least in part on the determined current state of the trip, and/or the like) data describing one or more interfaces (e.g., additional, updated, and/or the like interfaces) for display by computing device 206 and can communicate such data to computing device 206, which can receive the data and can utilize the data to render the interface(s) for display (e.g., to the passenger, and/or the like). For example, referring to FIG. 4E, computing system 108 can generate, for example, in accordance with one or more parameters of computing device 206 (e.g., display size, input capabilities, operating system, and/or the like), data describing interface 410 for display by computing device 206 and can communicate such data to computing device 206, which can receive the data. As illustrated, interface 410 can include one or more elements indicating autonomous vehicle 10 is en route to the passenger's location, a determined pickup location, instructing the passenger to proceed to such a determined pickup location, and/or the like.

Returning to FIG. 3A, in some embodiments, a communication session in accordance with the short-range wireless-communication protocol associated with link 204 can be established via link 204 between autonomous vehicle 10 and computing device 206. In some of such embodiments, computing system 108 can communicate, to computing device 206, an identifier associated with a signal being emitted by autonomous vehicle 10 (e.g., by computing system 102, computing device(s) 104 and/or 202, and/or the like) in accordance with the short-range wireless-communication protocol, and computing device 206 can receive such identifier. Additionally or alternatively, at (316), computing system 108 can communicate, to autonomous vehicle 10 (e.g., computing system 102, computing device(s) 104 and/or 202, and/or the like), an identifier associated with a signal being emitted by computing device 206 in accordance with the short-range wireless-communication protocol, and autonomous vehicle 10 can receive such identifier.

Computing system 108 can also determine (e.g., based at least in part on a profile associated with the passenger, and/or the like) one or more preferences of the passenger (e.g., regarding cabin climate inside autonomous vehicle 10, a seat position of autonomous vehicle 10, audio and/or video inside autonomous vehicle 10, and/or the like) and can communicate data indicating the preference(s) to autonomous vehicle 10, which can receive such data. At (318), autonomous vehicle 10 can adjust (e.g., based at least in part on the determined current state of the trip, and/or the like) one or more parameters of autonomous vehicle 10, for example, in accordance with the preference(s) of the passenger. For example, based at least in part on a determination that autonomous vehicle 10 is en route to the passenger's location, the determined pickup location, and/or the like, autonomous vehicle 10 can adjust the parameter(s) such that climate inside autonomous vehicle 10, a seat position inside autonomous vehicle 10, and/or the like are in accordance with the preference(s) of the passenger.

At (320), data (e.g., associated with a handshake procedure, and/or the like) can be communicated (e.g., via link 204, as indicated by the cross-hatched box over the line extending downward from link 204, and/or the like) between autonomous vehicle 10 (e.g., computing system 102, computing device(s) 104 and/or 202, and/or the like) and computing device 206, and a communication session in accordance with the short-range wireless-communication protocol associated with link 204 can be established via link 204 between autonomous vehicle 10 and computing device 206. For example, such data can be communicated based at least in part on the identifier associated with the signal being emitted by autonomous vehicle 10, the identifier associated with the signal being emitted by computing device 206, and/or the like.

At (322), computing device 206 can generate, for example, based at least in part on one or more signals (e.g., global positioning system (GPS) signals, wireless network signals, and/or the like) received by computing device 206, data indicating the current location of the passenger and can communicate such data to computing system 108, which can receive the data.

At (324), autonomous vehicle 10 and/or computing system 108 can determine a current state of the trip from amongst the various predefined, finite, and distinct states. For example, at (324A), autonomous vehicle 10 (e.g., computing system 102, computing device(s) 104 and/or 202, and/or the like) can determine that the current state of the trip is a state corresponding to arrival of autonomous vehicle 10 at the location of the passenger, the pickup location for the passenger, and/or the like. Such a state can be characterized by the trip having not commenced, the passenger being located outside autonomous vehicle 10, entry to autonomous vehicle 10 being secured (e.g., one or more doors, hatches, trunks, and/or the like of autonomous vehicle 10 being closed, latched, locked, and/or the like), proximity of autonomous vehicle 10 to the passenger, the pickup location for the passenger, and/or the like.

In some embodiments, the current state of the trip can be determined based at least in part on establishment of the communication session via link 204 between autonomous vehicle 10 and computing device 206, data communicated via the communication session, a strength of a signal associated with the communication session, and/or the like. For example, autonomous vehicle 10 can determine that the current state of the trip is the state corresponding to arrival of autonomous vehicle 10 at the location of the passenger, the pickup location for the passenger, and/or the like based at least in part on establishment of the communication session via link 204 between autonomous vehicle 10 and computing device 206 (e.g., establishment of the communication session can indicate proximity of autonomous vehicle 10 to the passenger, and/or the like), data communicated via the communication session (e.g., communication of the data at (320) can indicate proximity of autonomous vehicle 10 to the passenger, and/or the like), and/or a strength of a signal associated with the communication session (e.g., a strength of a signal received by autonomous vehicle 10 from computing device 206 via link 204 can indicate proximity of autonomous vehicle 10 to the passenger, and/or the like). In some embodiments, autonomous vehicle 10 can determine (e.g., based at least in part on establishment of the communication session via link 204 between autonomous vehicle 10 and computing device 206, data communicated via the communication session, a strength of a signal associated with the communication session, and/or the like) whether computing device 206 (e.g., the passenger, and/or the like) is located outside autonomous vehicle 10, inside autonomous vehicle 10, and/or the like.

Additionally or alternatively, at (324B), computing system 108 can determine that the current state of the trip is the state corresponding to arrival of autonomous vehicle 10 at the location of the passenger, the pickup location for the passenger, and/or the like. In some embodiments, the current state of the trip can be determined based at least in part on a determined location of computing device 206 (e.g., the passenger, and/or the like), a determined location for autonomous vehicle 10, a distance between the determined locations for computing device 206 and autonomous vehicle 10, and a predetermined threshold distance (e.g., radius around autonomous vehicle 10, and/or the like) indicating proximity of autonomous vehicle 10 to the passenger, and/or the like. For example, computing system 108 can determine (e.g., based at least in part on the data received at (322), and/or the like) that computing device 206 (e.g., the passenger, and/or the like) is within a predetermined threshold distance of autonomous vehicle 10 indicating proximity of autonomous vehicle 10 to the passenger, and/or the like. In some embodiments, computing system 108 can determine (e.g., based at least in part on the data received at (322), and/or the like) whether computing device 206 (e.g., the passenger, and/or the like) is located outside autonomous vehicle 10, inside autonomous vehicle 10, and/or the like.

Figure 3B:
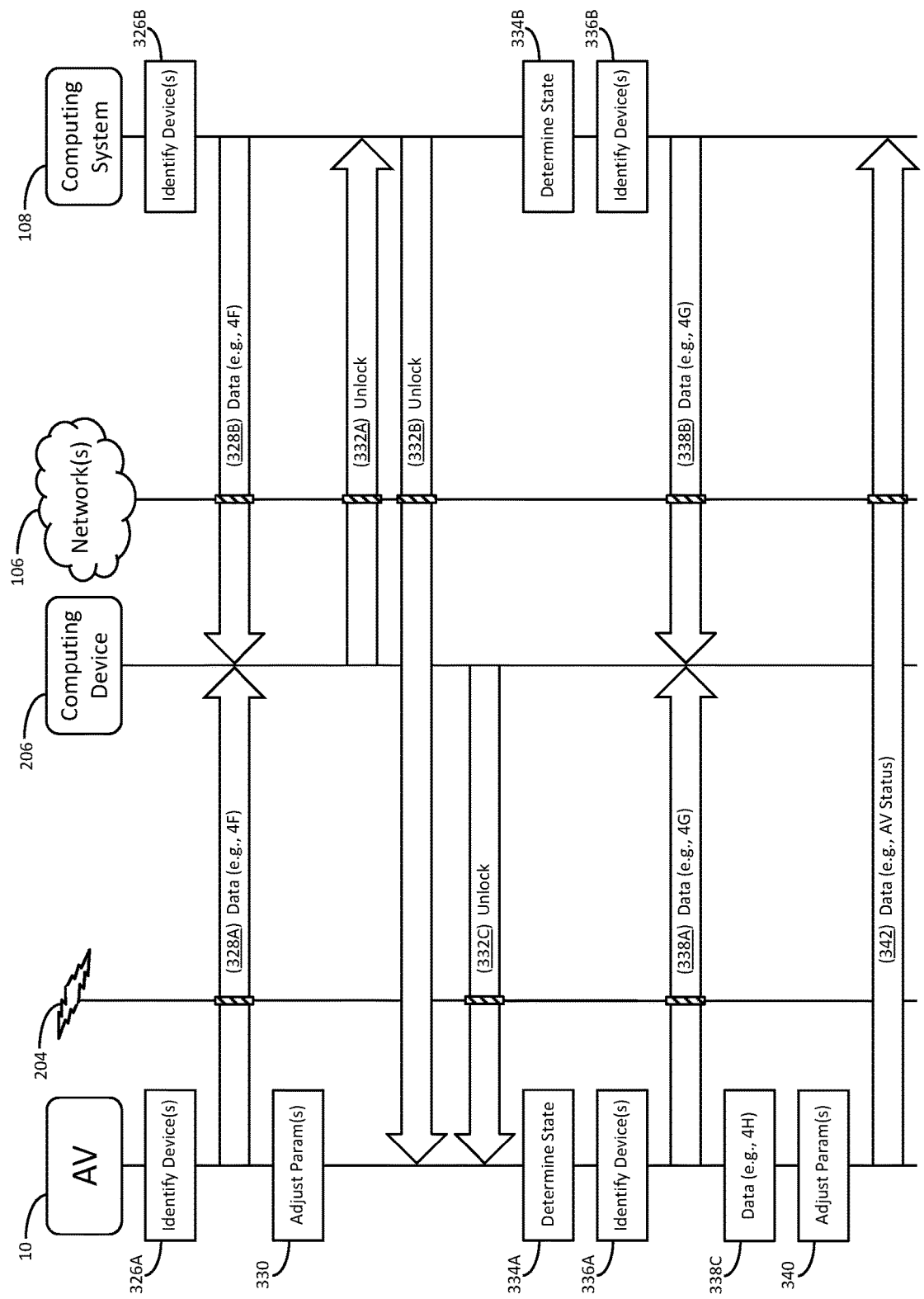

Referring to FIG. 3B, at (326), autonomous vehicle 10 and/or computing system 108 can identify (e.g., based at least in part on the determined current state of the trip, and/or the like) computing device 206 as being associated with the passenger (e.g., being presently viewable by the passenger, and/or the like). For example, at (326A), autonomous vehicle 10 (e.g., computing system 102, computing device(s) 104 and/or 202, and/or the like) can identify computing device 206 based at least in part on establishment of the communication session via link 204 between autonomous vehicle 10 and computing device 206, data communicated via the communication session, a strength of a signal associated with the communication session, and/or the like. Additionally or alternatively, at (326B), computing system 108 can identify computing device 206 based at least in part on information included in the request received from computing device 206, a determination of the passenger's current location, the current location of autonomous vehicle 10, proximity of autonomous vehicle 10 to the passenger, and/or the like.

Figure 4F:
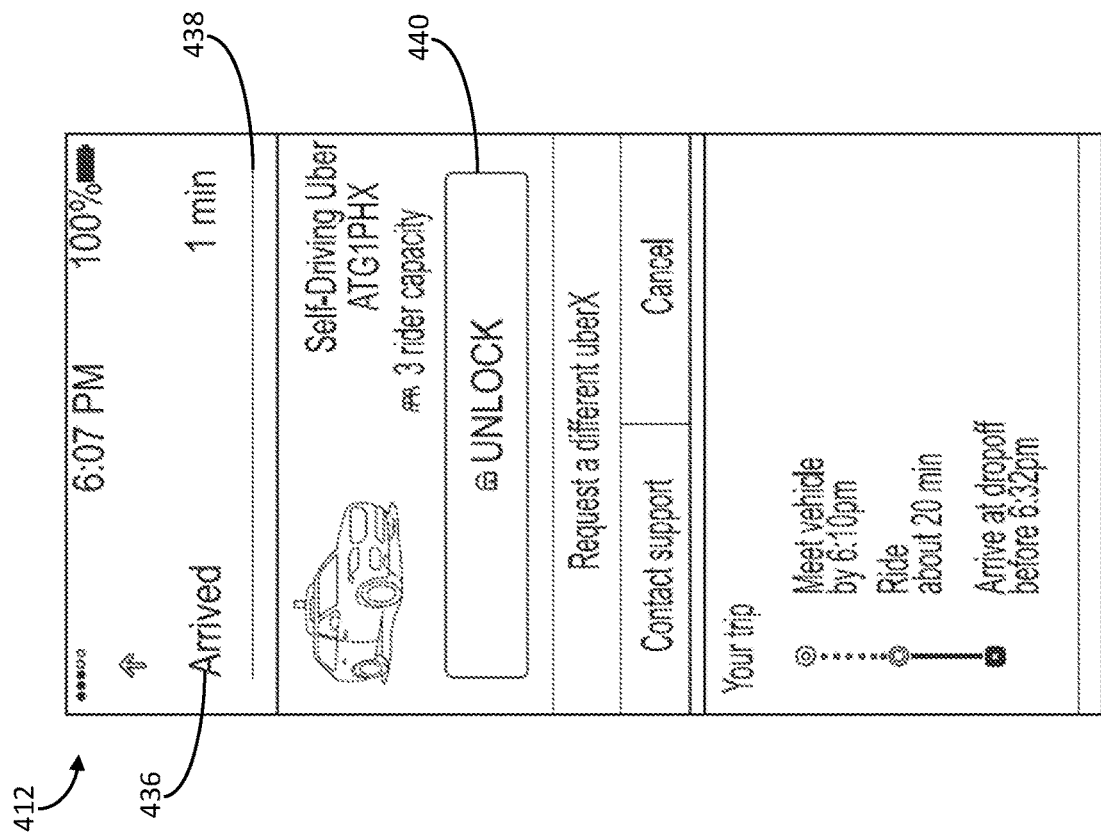

At (328), autonomous vehicle 10 and/or computing system 108 can generate (e.g., based at least in part on the determined current state of the trip, and/or the like) data describing one or more interfaces (e.g., additional, updated, and/or the like interfaces) for display by computing device 206 and can communicate such data to computing device 206, which can receive the data and can utilize the data to render the interface(s) for display (e.g., to the passenger, and/or the like). For example, at (328A), autonomous vehicle 10 (e.g., computing system 102, computing device(s) 104 and/or 202, and/or the like) can generate data describing such interface(s) and can communicate such data to computing device 206, which can receive the data. Additionally or alternatively, at (328B), computing system 108 can generate data describing such interface(s) and can communicate such data to computing device 206, which can receive the data. For example, referring to FIG. 4F, autonomous vehicle 10 and/or computing system 108 can generate, for example, in accordance with one or more parameters of computing device 206 (e.g., display size, input capabilities, operating system, and/or the like), data describing interface 412 for display by computing device 206 and can communicate such data to computing device 206, which can receive the data. As illustrated, interface 412 can include element 436 indicating the determined current state of the trip (e.g., the state corresponding to arrival of autonomous vehicle 10 at the location of the passenger, the pickup location for the passenger, and/or the like), element 438 graphically depicting progress of the trip (e.g., from the location of the passenger, the pickup location for the passenger, and/or the like to the destination, and/or the like), element 440 for enabling the passenger to unlock autonomous vehicle 10, and/or the like.

In some embodiments, autonomous vehicle 10 and/or computing system 108 can determine (e.g., based at least in part on the determined current state of the trip, and/or the like) a next state of the trip from amongst the various states. For example, autonomous vehicle 10 and/or computing system 108 can determine (e.g., based at least in part on the determined current state of the trip, and/or the like) that a next state of the trip is a state corresponding to autonomous vehicle 10 being unlocked for entry by the passenger at the location of the passenger, the pickup location for the passenger, and/or the like. Such a state can be characterized by the trip having not commenced, the passenger being located outside autonomous vehicle 10, entry to autonomous vehicle 10 being unsecured, proximity of autonomous vehicle 10 to the passenger, the pickup location for the passenger, and/or the like. In some of such embodiments, the interface(s) can prompt the passenger to take one or more actions to transition from the current state of the trip to the next state of the trip. The action(s) can correspond to one or more functions of autonomous vehicle 10 upon which the next state depends, and/or the like. For example, the state corresponding to autonomous vehicle 10 being unlocked for entry by the passenger at the location of the passenger, the pickup location for the passenger, and/or the like can depend on autonomous vehicle 10 being unlocked, interface 412 can prompt the passenger to take (e.g., by invoking element 440, and/or the like) one or more actions (e.g., unlocking autonomous vehicle 10, and/or the like) to transition from the current state of the trip to the next state of the trip, and/or the like.

Returning to FIG. 3B, at (330), autonomous vehicle 10 can adjust (e.g., based at least in part on the determined current state of the trip, and/or the like) one or more parameters of autonomous vehicle 10. For example, based at least in part on a determination that autonomous vehicle 10 has arrived at the location of the passenger, the pickup location for the passenger, and/or the like, autonomous vehicle 10 can adjust the parameter(s) such that a visual indicator located on the outside of autonomous vehicle 10 (e.g., headlight, turn signal, and/or the like) and/or an audible indicator configured to project sound outside autonomous vehicle 10 (e.g., horn, and/or the like) signal to the passenger the presence, location, and/or the like of autonomous vehicle 10.

At (332), the passenger can take (e.g., in response to the prompt(s), and/or the like) the action(s) to transition from the current state of the trip to the next state of the trip. For example, the passenger can invoke a function to unlock autonomous vehicle 10 (e.g., by interacting with element 440, and/or the like). In some embodiments, responsive to the action(s), at (332A), computing device 206 can generate data indicating the action(s) and can communicate such data to computing system 108, which can receive the data and responsive to receiving the data, at (332B), can generate data indicating the action(s) and can communicate such data to autonomous vehicle 10, which can receive the data and responsive to receiving the data, can perform the function (e.g., unlock autonomous vehicle 10, and/or the like). Additionally or alternatively, responsive to the action(s), at (332C), computing device 206 can generate data indicating the action(s) and can communicate such data to autonomous vehicle 10, which can receive the data and responsive to receiving the data, can perform the function (e.g., unlock autonomous vehicle 10, and/or the like).

At (334), autonomous vehicle 10 and/or computing system 108 can determine a current state of the trip from amongst the various predefined, finite, and distinct states. For example, at (334A), autonomous vehicle 10 (e.g., computing system 102, computing device(s) 104 and/or 202, and/or the like) can determine that the current state of the trip is a state corresponding to the passenger being located inside autonomous vehicle 10 and the trip not being ready to commence. Such a state can be characterized by entry to autonomous vehicle 10 being unsecured (e.g., a door, hatch, trunk, and/or the like of autonomous vehicle 10 being ajar, unlatched, unlocked, and/or the like), the passenger being unsecured (e.g., unbuckled, and/or the like), the trip having not commenced, the passenger being located inside autonomous vehicle 10, and/or the like.

In some embodiments, the current state of the trip can be determined based at least in part on one or more physical interactions between the passenger and autonomous vehicle 10. Such physical interactions can include, for example, opening a door, hatch, trunk, and/or the like, closing a door, hatch, trunk, and/or the like, locking a door, hatch, trunk, and/or the like, unlocking a door, hatch, trunk, and/or the like, buckling a seatbelt, unbuckling a seatbelt, adjusting a seat position, adjusting a cabin-lighting control, adjusting a cabin-climate control, sitting in a seat, rising from a seat, and/or the like. In some of such embodiments, one or more of such physical interaction(s) can be detected based at least in part on data generated by a door sensor of autonomous vehicle 10, a seat-pressure sensor of autonomous vehicle 10, a seatbelt sensor of autonomous vehicle 10, a camera of autonomous vehicle 10 located outside autonomous vehicle 10, a camera of autonomous vehicle 10 located inside autonomous vehicle 10, a thermal sensor of autonomous vehicle 10 located outside autonomous vehicle 10, a thermal sensor of autonomous vehicle 10 located inside autonomous vehicle 10, and/or the like.

For example, autonomous vehicle 10 (e.g., computing system 102, computing device(s) 104 and/or 202, and/or the like) can determine that the current state of the trip is the state corresponding to the passenger being located inside autonomous vehicle 10 and the trip not being ready to commence based at least in part on the passenger entering autonomous vehicle 10 and not having secured one or more doors, hatches, trunks, and/or the like of autonomous vehicle 10, not having buckled their seatbelt, and/or the like. Autonomous vehicle 10 can make such a determination, for example, by detecting (e.g., based at least in part on data generated by a door sensor of autonomous vehicle 10, a seat-pressure sensor of autonomous vehicle 10, a camera of autonomous vehicle 10 located outside autonomous vehicle 10, a camera of autonomous vehicle 10 located inside autonomous vehicle 10, a thermal sensor of autonomous vehicle 10 located outside autonomous vehicle 10, a thermal sensor of autonomous vehicle 10 located inside autonomous vehicle 10, and/or the like) that the passenger has entered autonomous vehicle 10, detecting (e.g., based at least in part on data generated by a door sensor of autonomous vehicle 10, a camera of autonomous vehicle 10 located outside autonomous vehicle 10, a camera of autonomous vehicle 10 located inside autonomous vehicle 10, and/or the like) that the passenger has not secured one or more doors, hatches, trunks, and/or the like of autonomous vehicle 10, detecting (e.g., based at least in part on data generated by a seatbelt sensor of autonomous vehicle 10, a camera of autonomous vehicle 10 located inside autonomous vehicle 10, and/or the like) that the passenger has not buckled their seatbelt, and/or the like.

Additionally or alternatively, at (334B), computing system 108 can determine that the current state of the trip is the state corresponding to the passenger being located inside autonomous vehicle 10 and the trip not being ready to commence. For example, computing system 108 can determine (e.g., based at least in part on the data received at (332), and/or the like) that the passenger is located inside autonomous vehicle 10, and/or the like.

At (336), autonomous vehicle 10 and/or computing system 108 can identify (e.g., based at least in part on the determined current state of the trip, and/or the like) computing device(s) 202 and/or 206 as being associated with the passenger (e.g., being presently viewable by the passenger, and/or the like). For example, at (336A), autonomous vehicle 10 (e.g., computing system 102, computing device(s) 104 and/or 202, and/or the like) can identify computing device(s) 202 and/or 206 based at least in part on the determined current state of the trip indicating the passenger is located inside autonomous vehicle 10, establishment of the communication session via link 204 between autonomous vehicle 10 and computing device 206, data communicated via the communication session, a strength of a signal associated with the communication session, and/or the like. Additionally or alternatively, at (336B), computing system 108 can identify computing device(s) 202 and/or 206 based at least in part on the determined current state of the trip indicating the passenger is located inside autonomous vehicle 10, information included in the request received from computing device 206, and/or the like.

Figure 4G:
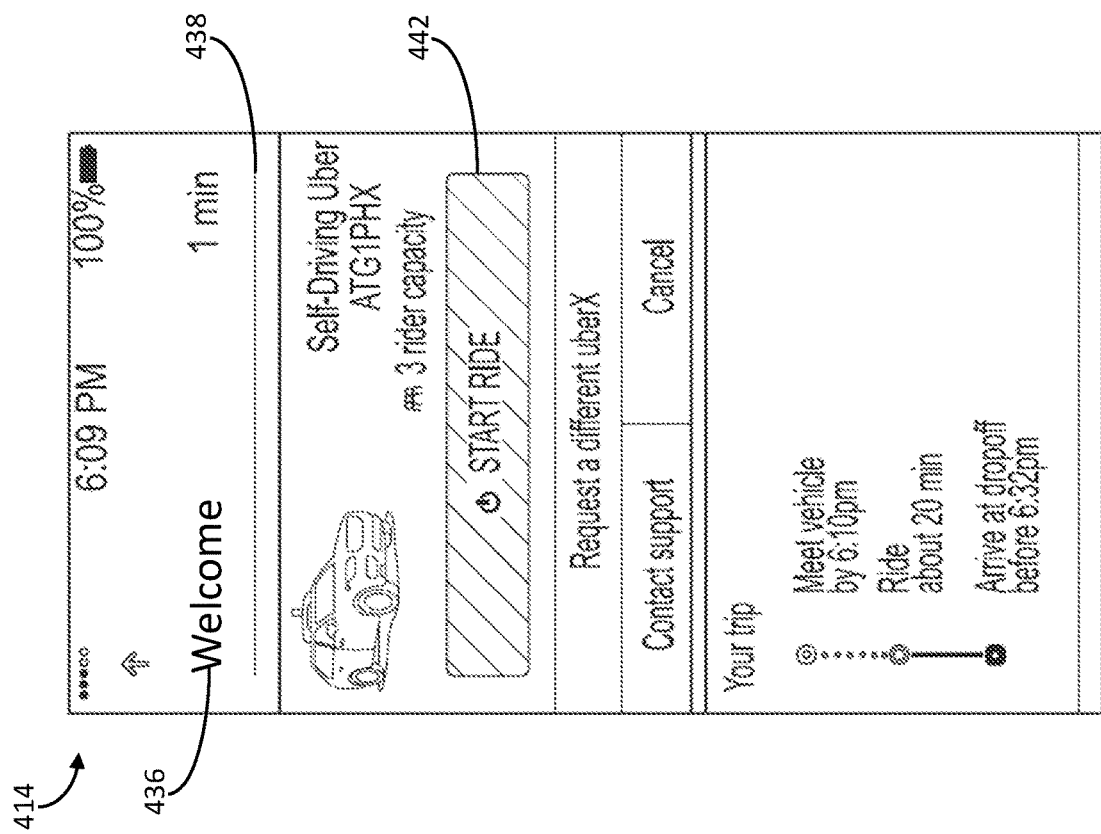

At (338), autonomous vehicle 10 and/or computing system 108 can generate (e.g., based at least in part on the determined current state of the trip, and/or the like) data describing one or more interfaces (e.g., additional, updated, and/or the like interfaces) for display by computing device(s) 202 and/or 206 and can communicate such data to computing device(s) 202 and/or 206, which can receive the data and can utilize the data to render the interface(s) for display (e.g., to the passenger, and/or the like). For example, at (338A), autonomous vehicle 10 (e.g., computing system 102, computing device(s) 104 and/or 202, and/or the like) can generate data describing such interface(s) and can communicate such data to computing device 206, which can receive the data. Additionally or alternatively, at (338B), computing system 108 can generate data describing such interface(s) and can communicate such data to computing device 206, which can receive the data. For example, referring to FIG. 4G, autonomous vehicle 10 and/or computing system 108 can generate, for example, in accordance with one or more parameters of computing device 206 (e.g., display size, input capabilities, operating system, and/or the like), data describing interface 414 for display by computing device 206 and can communicate such data to computing device 206, which can receive the data. As illustrated, interface 414 can include element 436 indicating the determined current state of the trip (e.g., the state corresponding to the passenger being located inside autonomous vehicle 10 and the trip not being ready to commence, and/or the like), element 438 graphically depicting progress of the trip (e.g., from the location of the passenger, the pickup location for the passenger, and/or the like to the destination, and/or the like), element 442 for enabling the passenger to start the trip, and/or the like. As illustrated, based at least in part on the determined current state of the trip (e.g., the trip not being ready to commence, and/or the like), element 442 can be disabled (e.g. grayed out, unavailable for invocation by the passenger, and/or the like).

Figure 4H:
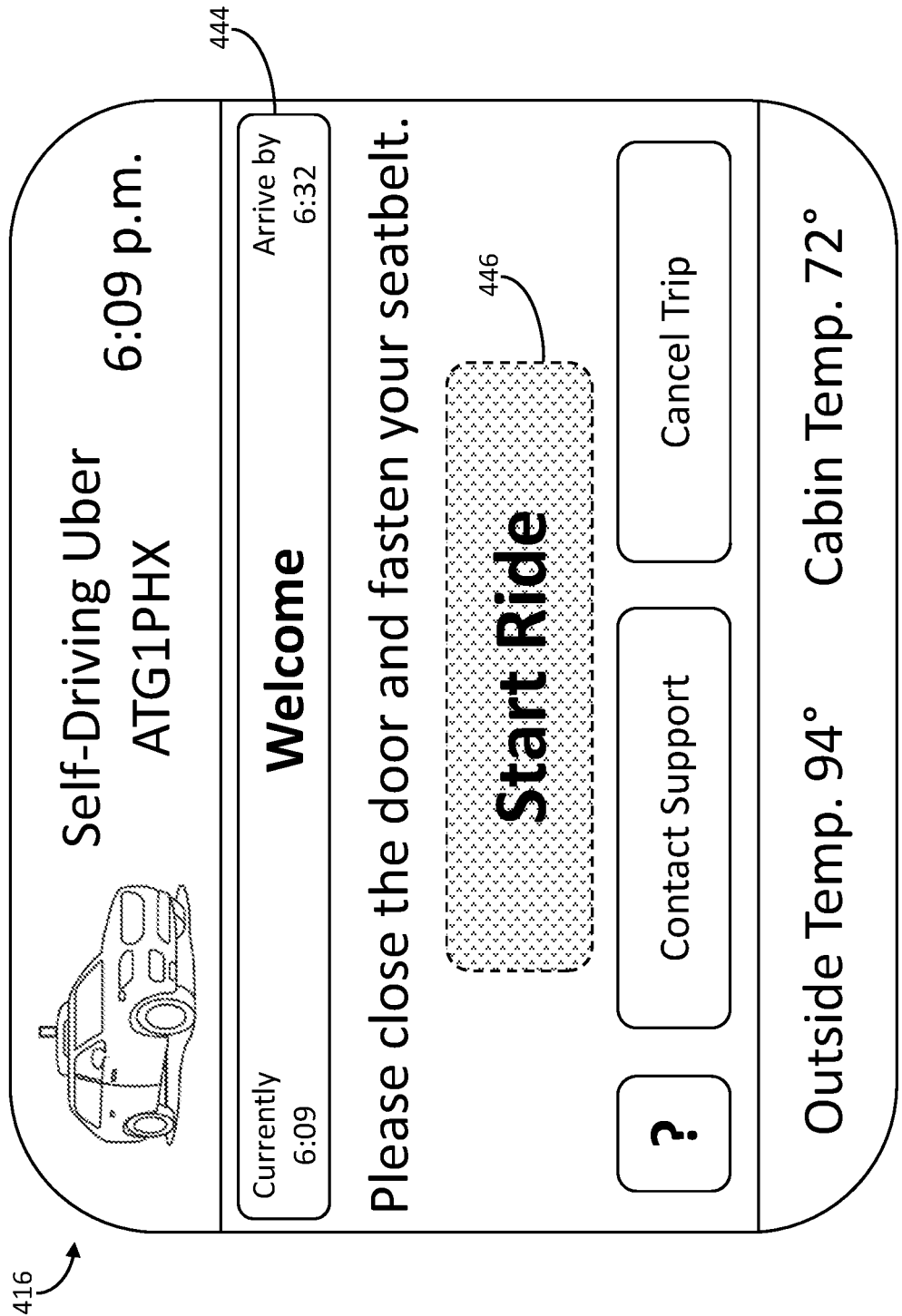

Returning to FIG. 3B, additionally or alternatively, at (338C), autonomous vehicle 10 (e.g., computing system 102, computing device(s) 104 and/or 202, and/or the like) can generate data describing such interface(s) and can communicate such data to computing device 202, which can receive the data. For example, referring to FIG. 4H, autonomous vehicle 10 can generate, for example, in accordance with one or more parameters of computing device 202 (e.g., display size, input capabilities, operating system, and/or the like), data describing interface 416 for display by computing device 202 and can communicate such data to computing device 202, which can receive the data. As illustrated, interface 416 can include element 444 indicating the determined current state of the trip (e.g., the state corresponding to the passenger being located inside autonomous vehicle 10 and the trip not being ready to commence, and/or the like) and/or graphically depicting progress of the trip (e.g., from the location of the passenger, the pickup location for the passenger, and/or the like to the destination, and/or the like), element 446 for enabling the passenger to start the trip, and/or the like. As illustrated, based at least in part on the determined current state of the trip (e.g., the trip not being ready to commence, and/or the like), element 446 can be disabled (e.g. grayed out, unavailable for invocation by the passenger, and/or the like).

In some embodiments, autonomous vehicle 10 and/or computing system 108 can determine (e.g., based at least in part on the determined current state of the trip, and/or the like) a next state of the trip from amongst the various states. For example, autonomous vehicle 10 and/or computing system 108 can determine (e.g., based at least in part on the determined current state of the trip, and/or the like) that a next state of the trip is a state corresponding to the passenger being located inside autonomous vehicle 10 and the trip being ready to commence. Such a state can be characterized by entry to autonomous vehicle 10 being secured (e.g., one or more doors, hatches, trunks, and/or the like of autonomous vehicle 10 being closed, latched, locked, and/or the like), the passenger being secured (e.g., buckled, and/or the like), the trip having not commenced, the passenger being located inside autonomous vehicle 10, and/or the like. In some of such embodiments, the interface(s) can prompt the passenger to take one or more actions to transition from the current state of the trip to the next state of the trip. The action(s) can correspond to one or more functions of autonomous vehicle 10 upon which the next state depends, and/or the like. For example, the state corresponding to the passenger being located inside autonomous vehicle 10 and the trip being ready to commence can depend on entry to autonomous vehicle 10 being secured, the passenger being secured, and/or the like, interface 416 can prompt the passenger to take one or more actions (e.g., close a door, hatch, trunk, and/or the like of autonomous vehicle 10, buckle up, and/or the like) to transition from the current state of the trip to the next state of the trip, and/or the like. Additionally or alternatively, autonomous vehicle 10 (e.g., computing system 102, computing device(s) 104 and/or 202, and/or the like) and/or computing system 108 can cause autonomous vehicle 10 to produce audio prompting the passenger to take such action(s).

Returning to FIG. 3B, at (340), autonomous vehicle 10 can adjust (e.g., based at least in part on the determined current state of the trip, and/or the like) one or more parameters of autonomous vehicle 10. For example, based at least in part on a determination that the current state of the trip corresponds to autonomous vehicle 10 being unlocked for entry by the passenger at the location of the passenger, the pickup location for the passenger, and/or the like, autonomous vehicle 10 can adjust the parameter(s) such that lighting inside autonomous vehicle 10 accommodates entry by the passenger, and/or the like.

The passenger can take (e.g., in response to the prompt(s), and/or the like) the action(s) (e.g., closing the door, hatch, trunk, and/or the like of autonomous vehicle 10, buckling up, and/or the like) to transition from the current state of the trip to the next state of the trip, and, autonomous vehicle 10 can detect (e.g., based at least in part on data generated by a door sensor of autonomous vehicle 10, a seatbelt sensor of autonomous vehicle 10, and/or the like) that the passenger has taken the action(s). At (342), autonomous vehicle 10 can generate data indicating the passenger has taken the action(s) and can communicate such data to computing system 108, which can receive the data.

Figure 3C:
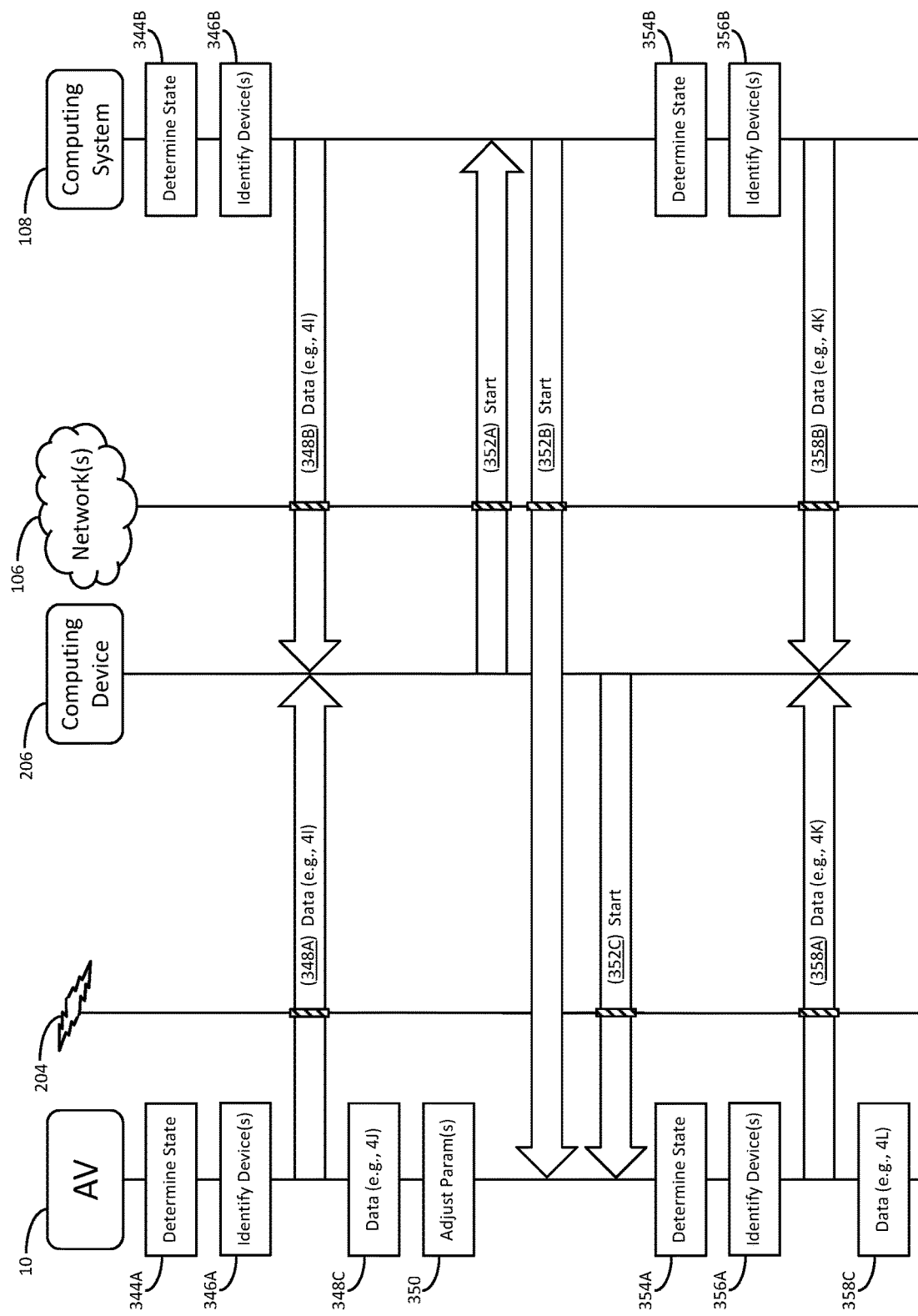

Referring to FIG. 3C, at (344), autonomous vehicle 10 and/or computing system 108 can determine a current state of the trip from amongst the various predefined, finite, and distinct states. For example, at (344A), autonomous vehicle 10 (e.g., computing system 102, computing device(s) 104 and/or 202, and/or the like) can determine that the current state of the trip is the state corresponding to the passenger being located inside the autonomous vehicle and the trip being ready to commence.

As indicated above, in some embodiments, the current state of the trip can be determined based at least in part on one or more physical interactions between the passenger and autonomous vehicle 10. For example, autonomous vehicle 10 (e.g., computing system 102, computing device(s) 104 and/or 202, and/or the like) can determine that the current state of the trip is the state corresponding to the passenger being located inside the autonomous vehicle and the trip being ready to commence based at least in part on the passenger taking the action(s) (e.g., closing the door, hatch, trunk, and/or the like of autonomous vehicle 10, buckling up, and/or the like) to transition to the next state of the trip.

Additionally or alternatively, at (344B), computing system 108 can determine that the current state of the trip is the state corresponding to the passenger being located inside the autonomous vehicle and the trip being ready to commence. For example, computing system 108 can determine (e.g., based at least in part on the data received at (342), and/or the like) that the passenger is located inside autonomous vehicle 10, has taken the action(s) (e.g., closing the door, hatch, trunk, and/or the like of autonomous vehicle 10, buckling up, and/or the like) to transition to the next state of the trip, and/or the like.

At (346), autonomous vehicle 10 and/or computing system 108 can identify (e.g., based at least in part on the determined current state of the trip, and/or the like) computing device(s) 202 and/or 206 as being associated with the passenger (e.g., being presently viewable by the passenger, and/or the like). For example, at (346A), autonomous vehicle 10 (e.g., computing system 102, computing device(s) 104 and/or 202, and/or the like) can identify computing device(s) 202 and/or 206 based at least in part on the determined current state of the trip indicating the passenger is located inside autonomous vehicle 10, establishment of the communication session via link 204 between autonomous vehicle 10 and computing device 206, data communicated via the communication session, a strength of a signal associated with the communication session, and/or the like. Additionally or alternatively, at (346B), computing system 108 can identify computing device(s) 202 and/or 206 based at least in part on the determined current state of the trip indicating the passenger is located inside autonomous vehicle 10, information included in the request received from computing device 206, and/or the like.

Figure 4I:
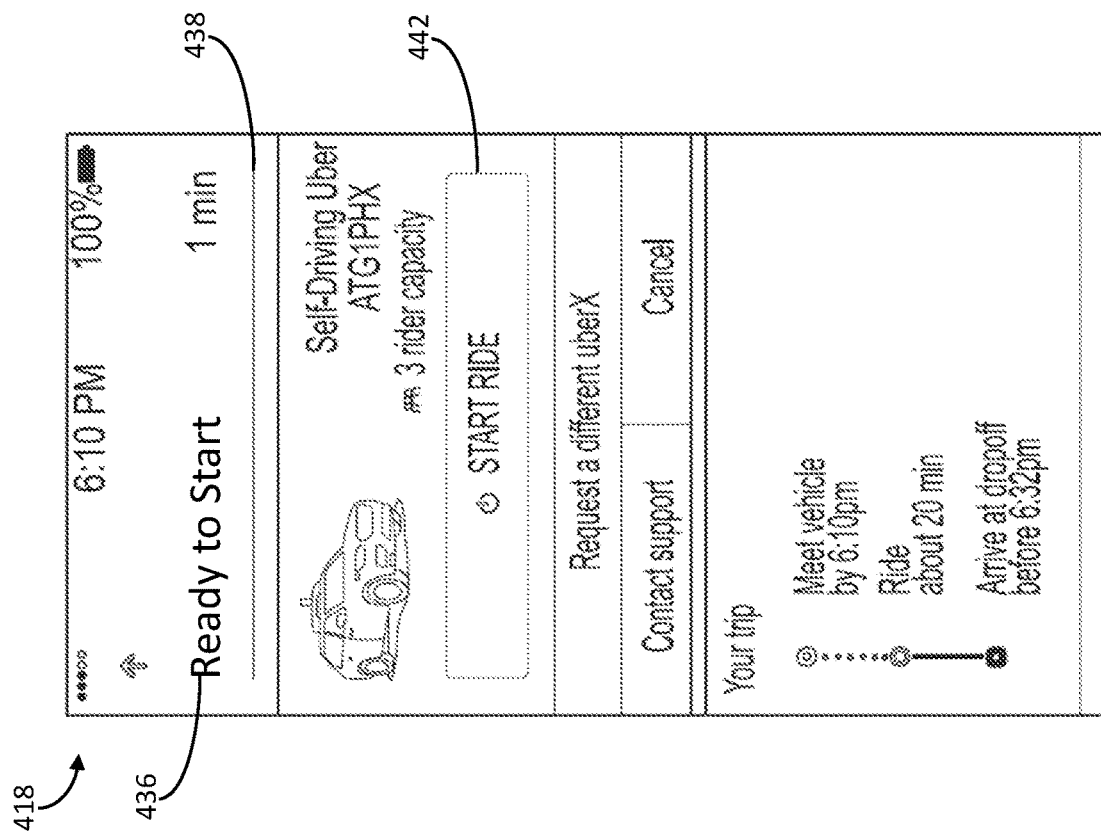

At (348), autonomous vehicle 10 and/or computing system 108 can generate (e.g., based at least in part on the determined current state of the trip, and/or the like) data describing one or more interfaces (e.g., additional, updated, and/or the like interfaces) for display by computing device(s) 202 and/or 206 and can communicate such data to computing device(s) 202 and/or 206, which can receive the data and can utilize the data to render the interface(s) for display (e.g., to the passenger, and/or the like). For example, at (348A), autonomous vehicle 10 (e.g., computing system 102, computing device(s) 104 and/or 202, and/or the like) can generate data describing such interface(s) and can communicate such data to computing device 206, which can receive the data. Additionally or alternatively, at (348B), computing system 108 can generate data describing such interface(s) and can communicate such data to computing device 206, which can receive the data. For example, referring to FIG. 4I, autonomous vehicle 10 and/or computing system 108 can generate, for example, in accordance with one or more parameters of computing device 206 (e.g., display size, input capabilities, operating system, and/or the like), data describing interface 418 for display by computing device 206 and can communicate such data to computing device 206, which can receive the data. As illustrated, interface 418 can include element 436 indicating the determined current state of the trip (e.g., the state corresponding to the passenger being located inside autonomous vehicle 10 and the trip being ready to commence, and/or the like), element 438 graphically depicting progress of the trip (e.g., from the location of the passenger, the pickup location for the passenger, and/or the like to the destination, and/or the like), element 442 for enabling the passenger to start the trip, and/or the like. As illustrated, based at least in part on the determined current state of the trip (e.g., the trip being ready to commence, and/or the like), element 442 can be enabled (e.g. available for invocation by the passenger, and/or the like).

Figure 4J:
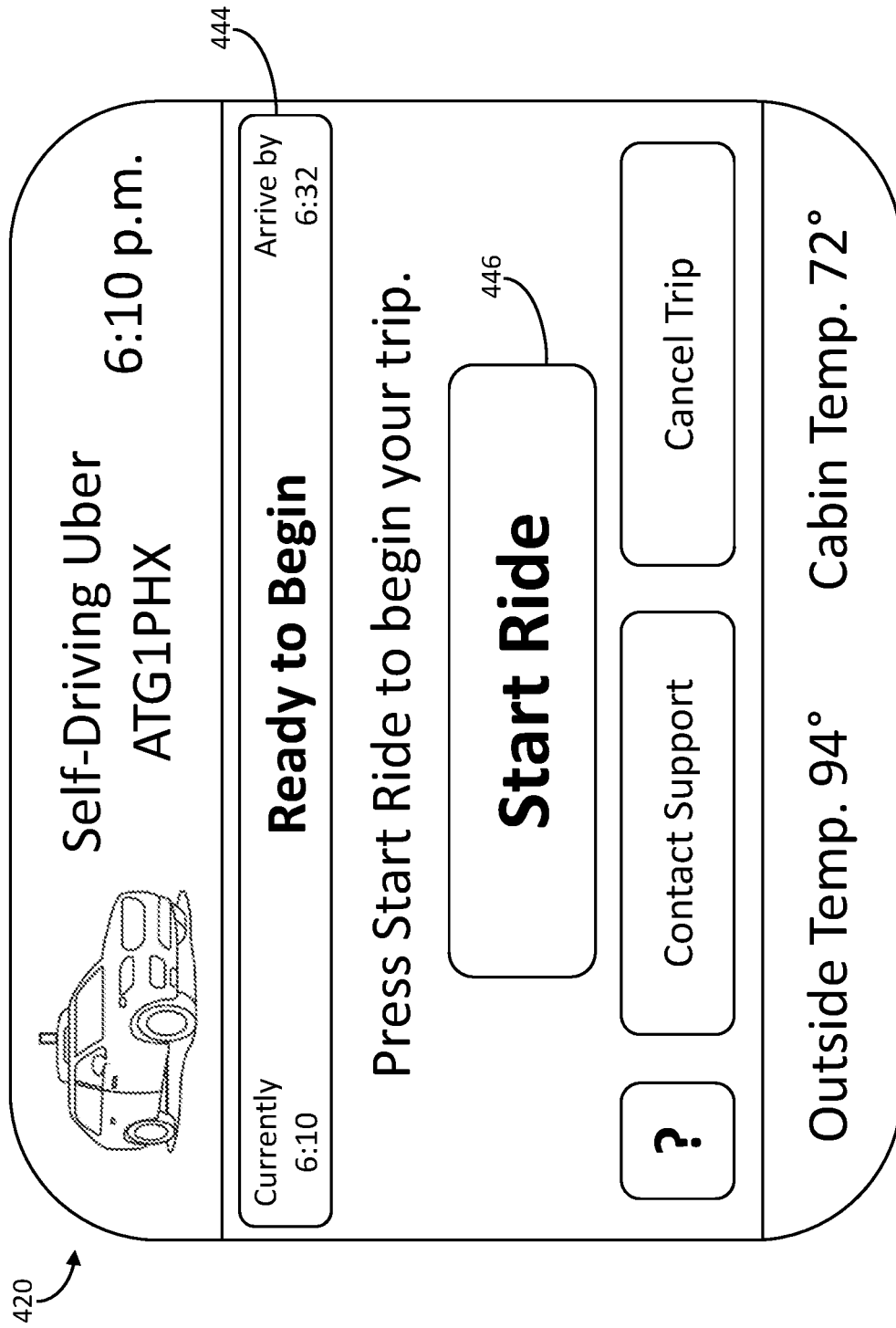

Returning to FIG. 3C, additionally or alternatively, at (348C), autonomous vehicle 10 (e.g., computing system 102, computing device(s) 104 and/or 202, and/or the like) can generate data describing such interface(s) and can communicate such data to computing device 202, which can receive the data. For example, referring to FIG. 4J, autonomous vehicle 10 can generate, for example, in accordance with one or more parameters of computing device 202 (e.g., display size, input capabilities, operating system, and/or the like), data describing interface 420 for display by computing device 202 and can communicate such data to computing device 202, which can receive the data. As illustrated, interface 420 can include element 444 indicating the determined current state of the trip (e.g., the state corresponding to the passenger being located inside autonomous vehicle 10 and the trip being ready to commence, and/or the like) and/or graphically depicting progress of the trip (e.g., from the location of the passenger, the pickup location for the passenger, and/or the like to the destination, and/or the like), element 446 for enabling the passenger to start the trip, and/or the like. As illustrated, based at least in part on the determined current state of the trip (e.g., the trip being ready to commence, and/or the like), element 446 can be enabled (e.g. available for invocation by the passenger, and/or the like).

In some embodiments, autonomous vehicle 10 and/or computing system 108 can determine (e.g., based at least in part on the determined current state of the trip, and/or the like) a next state of the trip from amongst the various states. For example, autonomous vehicle 10 and/or computing system 108 can determine (e.g., based at least in part on the determined current state of the trip, and/or the like) that a next state of the trip is a state corresponding to the passenger and autonomous vehicle 10 being en route to the destination of the trip. Such a state can be characterized by the passenger being located inside autonomous vehicle 10, locomotion of autonomous vehicle 10 along a route associated with the trip (e.g., to the destination, from the location of the passenger at which autonomous vehicle 10 previously arrived, the pickup location for the passenger, and/or the like), the trip having commenced, and/or the like.

In some of such embodiments, the interface(s) can prompt the passenger to take one or more actions to transition from the current state of the trip to the next state of the trip. The action(s) can correspond to one or more functions of autonomous vehicle 10 upon which the next state depends, and/or the like. For example, the state corresponding to the passenger and autonomous vehicle 10 being en route to the destination of the trip can depend on the passenger invoking element(s) 442 and/or 446, interface(s) 418 and/or 420 can prompt the passenger to take one or more actions (e.g., invoke element(s) 442 and/or 446, and/or the like) to transition from the current state of the trip to the next state of the trip, and/or the like. Additionally or alternatively, autonomous vehicle 10 (e.g., computing system 102, computing device(s) 104 and/or 202, and/or the like) and/or computing system 108 can cause autonomous vehicle 10 to produce audio prompting the passenger to take such action(s).

Returning to FIG. 3C, at (350), autonomous vehicle 10 can adjust (e.g., based at least in part on the determined current state of the trip, and/or the like) one or more parameters of autonomous vehicle 10. For example, based at least in part on a determination that the current state of the trip corresponds to the passenger being located inside autonomous vehicle 10 and the trip being ready to commence, and/or the like, autonomous vehicle 10 can adjust the parameter(s) such that lighting inside autonomous vehicle 10 indicates (e.g., by dimming, and/or the like) that the trip is ready to commence, and/or the like.

At (352), the passenger can take (e.g., in response to the prompt(s), and/or the like) the action(s) to transition from the current state of the trip to the next state of the trip. For example, the passenger can invoke a function to start the trip (e.g., by invoking element(s) 442 and/or 446, and/or the like). In some embodiments, responsive to the action(s), at (352A), computing device 206 can generate data indicating the action(s) and can communicate such data to computing system 108, which can receive the data and responsive to receiving the data, at (352B), can generate data indicating the action(s) and can communicate such data to autonomous vehicle 10, which can receive the data and responsive to receiving the data, can perform the function (e.g., start the trip, and/or the like). Additionally or alternatively, responsive to the action(s), at (352C), computing device 206 can generate data indicating the action(s) and can communicate such data to autonomous vehicle 10, which can receive the data and responsive to receiving the data, can perform the function (e.g., start the trip, and/or the like).

At (354), autonomous vehicle 10 and/or computing system 108 can determine a current state of the trip from amongst the various predefined, finite, and distinct states. For example, at (354A), autonomous vehicle 10 (e.g., computing system 102, computing device(s) 104 and/or 202, and/or the like) can determine that the current state of the trip is the state corresponding to the passenger and autonomous vehicle 10 being en route to the destination of the trip.

In some embodiments, the current state of the trip can be determined based at least in part on one or more actions performed via computing device(s) 202 and/or 206. For example, autonomous vehicle 10 (e.g., computing system 102, computing device(s) 104 and/or 202, and/or the like) can determine that the current state of the trip is the state corresponding to the passenger and autonomous vehicle 10 being en route to the destination of the trip based at least in part on the passenger invoking element(s) 442 and/or 446, and/or the like.

Additionally or alternatively, at (354B), computing system 108 can determine that the current state of the trip is the state corresponding to the passenger and autonomous vehicle 10 being en route to the destination of the trip. For example, computing system 108 can determine (e.g., based at least in part on the data received at (352), and/or the like) that the passenger is located inside autonomous vehicle 10, has taken the action(s) (e.g., invoking element(s) 442 and/or 446, and/or the like) to transition to the next state of the trip, and/or the like.

At (356), autonomous vehicle 10 and/or computing system 108 can identify (e.g., based at least in part on the determined current state of the trip, and/or the like) computing device(s) 202 and/or 206 as being associated with the passenger (e.g., being presently viewable by the passenger, and/or the like). For example, at (356A), autonomous vehicle 10 (e.g., computing system 102, computing device(s) 104 and/or 202, and/or the like) can identify computing device(s) 202 and/or 206 based at least in part on the determined current state of the trip indicating the passenger is located inside autonomous vehicle 10, establishment of the communication session via link 204 between autonomous vehicle 10 and computing device 206, data communicated via the communication session, a strength of a signal associated with the communication session, and/or the like. Additionally or alternatively, at (356B), computing system 108 can identify computing device(s) 202 and/or 206 based at least in part on the determined current state of the trip indicating the passenger is located inside autonomous vehicle 10, information included in the request received from computing device 206, and/or the like.

Figure 4K:
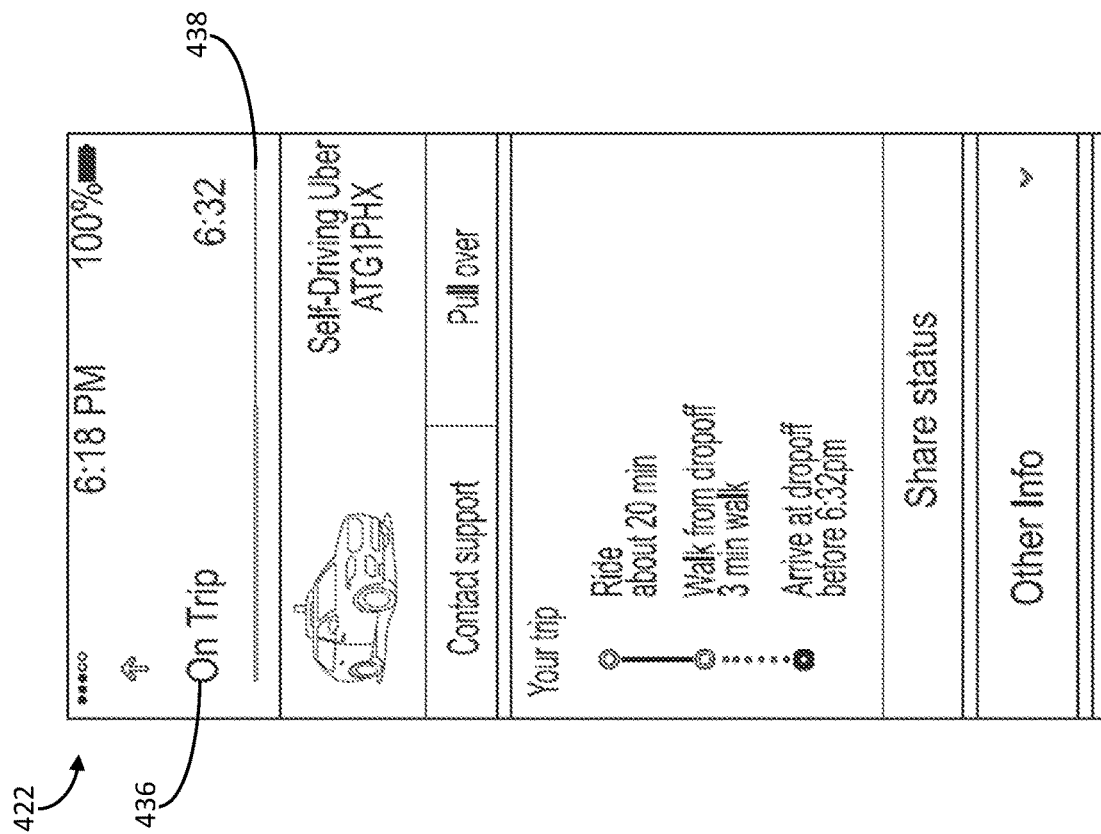

At (358), autonomous vehicle 10 and/or computing system 108 can generate (e.g., based at least in part on the determined current state of the trip, and/or the like) data describing one or more interfaces (e.g., additional, updated, and/or the like interfaces) for display by computing device(s) 202 and/or 206 and can communicate such data to computing device(s) 202 and/or 206, which can receive the data and can utilize the data to render the interface(s) for display (e.g., to the passenger, and/or the like). For example, at (358A), autonomous vehicle 10 (e.g., computing system 102, computing device(s) 104 and/or 202, and/or the like) can generate data describing such interface(s) and can communicate such data to computing device 206, which can receive the data. Additionally or alternatively, at (358B), computing system 108 can generate data describing such interface(s) and can communicate such data to computing device 206, which can receive the data. For example, referring to FIG. 4K, autonomous vehicle 10 and/or computing system 108 can generate, for example, in accordance with one or more parameters of computing device 206 (e.g., display size, input capabilities, operating system, and/or the like), data describing interface 422 for display by computing device 206 and can communicate such data to computing device 206, which can receive the data. As illustrated, interface 422 can include element 436 indicating the determined current state of the trip (e.g., the state corresponding to the passenger and autonomous vehicle 10 being en route to the destination of the trip, and/or the like) and/or element 438 graphically depicting progress of the trip (e.g., from the location of the passenger, the pickup location for the passenger, and/or the like to the destination, and/or the like).

Figure 4L:
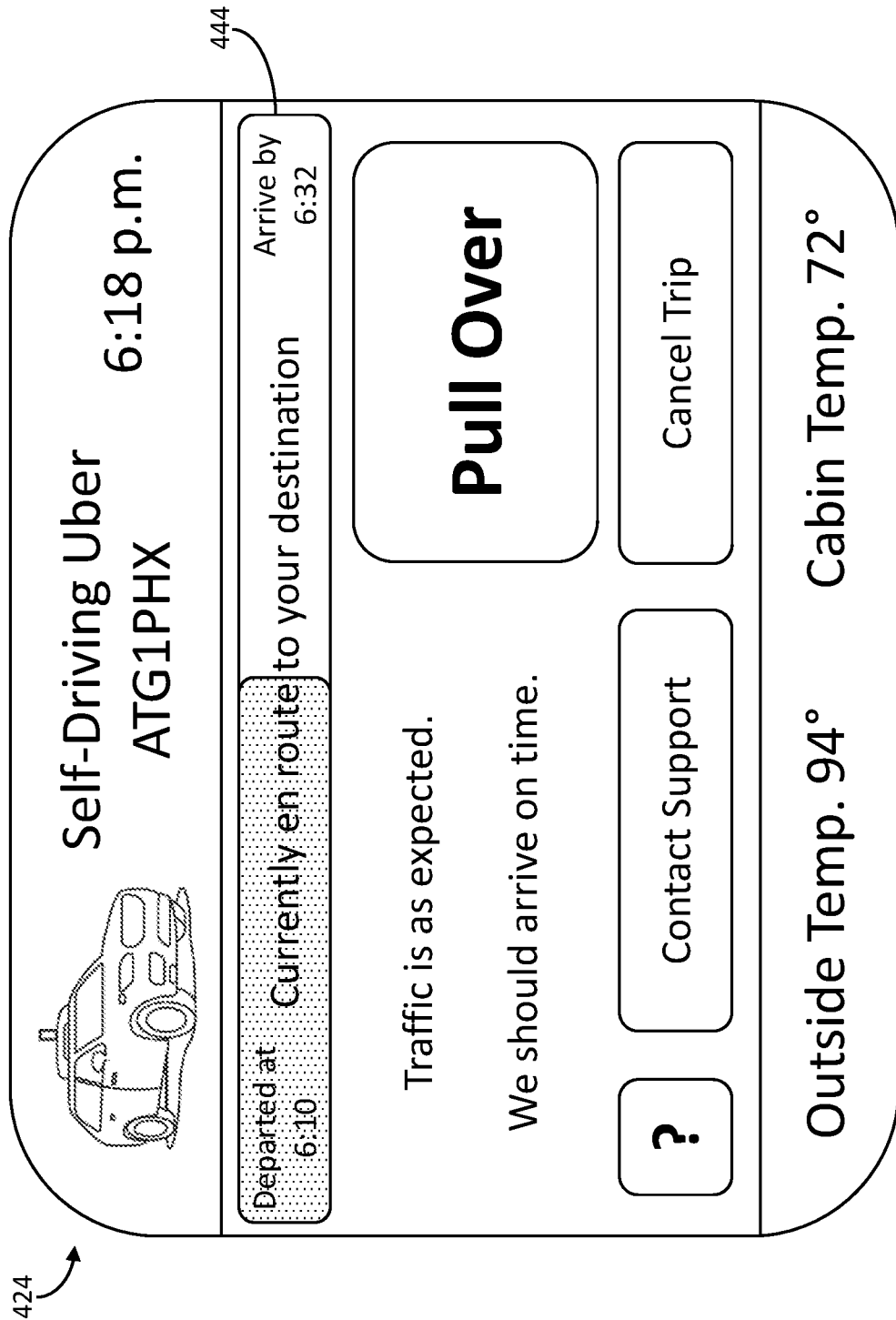

Returning to FIG. 3C, additionally or alternatively, at (358C), autonomous vehicle 10 (e.g., computing system 102, computing device(s) 104 and/or 202, and/or the like) can generate data describing such interface(s) and can communicate such data to computing device 202, which can receive the data. For example, referring to FIG. 4L, autonomous vehicle 10 can generate, for example, in accordance with one or more parameters of computing device 202 (e.g., display size, input capabilities, operating system, and/or the like), data describing interface 424 for display by computing device 202 and can communicate such data to computing device 202, which can receive the data. As illustrated, interface 424 can include element 444 indicating the determined current state of the trip (e.g., the state corresponding to the passenger and autonomous vehicle 10 being en route to the destination of the trip, and/or the like) and/or graphically depicting progress of the trip (e.g., from the location of the passenger, the pickup location for the passenger, and/or the like to the destination, and/or the like).

Figure 3D:
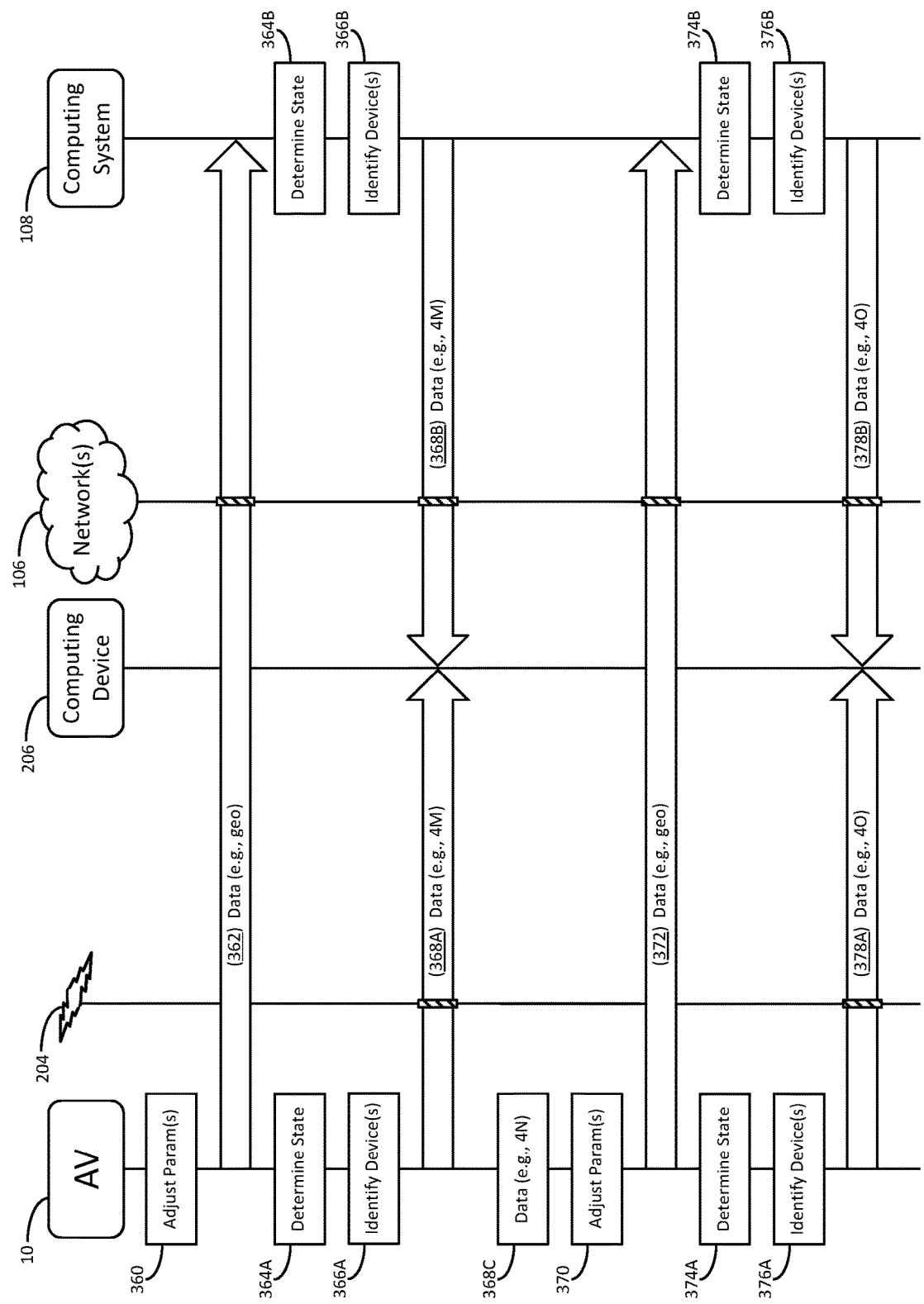

Referring to FIG. 3D, at (360), autonomous vehicle 10 can adjust (e.g., based at least in part on the determined current state of the trip, and/or the like) one or more parameters of autonomous vehicle 10. For example, based at least in part on a determination that the current state of the trip corresponds to the passenger and autonomous vehicle 10 being en route to the destination of the trip, and/or the like, autonomous vehicle 10 can adjust the parameter(s) such that audio, video, and/or the like inside autonomous vehicle 10 are in accordance with the preference(s) of the passenger.

At (362), autonomous vehicle 10 can generate data indicating a current location of autonomous vehicle 10 and can communicate such data to computing system 108, which can receive the data.

At (364), autonomous vehicle 10 and/or computing system 108 can determine a current state of the trip from amongst the various predefined, finite, and distinct states. For example, at (364A), autonomous vehicle 10 (e.g., computing system 102, computing device(s) 104 and/or 202, and/or the like) can determine that the current state of the trip is a state corresponding to autonomous vehicle 10 approaching the destination of the trip. Such a state can be characterized by proximity of autonomous vehicle 10 to the destination of the trip, the passenger being located inside autonomous vehicle 10, locomotion of autonomous vehicle 10 along the route associated with the trip, and/or the like.

Additionally or alternatively, at (364B), computing system 108 can determine that the current state of the trip is the state corresponding to autonomous vehicle 10 approaching the destination of the trip. For example, computing system 108 can determine (e.g., based at least in part on the data received at (362), and/or the like) that autonomous vehicle 10 is approaching the destination of the trip, and/or the like.

At (366), autonomous vehicle 10 and/or computing system 108 can identify (e.g., based at least in part on the determined current state of the trip, and/or the like) computing device(s) 202 and/or 206 as being associated with the passenger (e.g., being presently viewable by the passenger, and/or the like). For example, at (366A), autonomous vehicle 10 (e.g., computing system 102, computing device(s) 104 and/or 202, and/or the like) can identify computing device(s) 202 and/or 206 based at least in part on the determined current state of the trip indicating the passenger is located inside autonomous vehicle 10, establishment of the communication session via link 204 between autonomous vehicle 10 and computing device 206, data communicated via the communication session, a strength of a signal associated with the communication session, and/or the like. Additionally or alternatively, at (366B), computing system 108 can identify computing device(s) 202 and/or 206 based at least in part on the determined current state of the trip indicating the passenger is located inside autonomous vehicle 10, information included in the request received from computing device 206, and/or the like.

At (368), autonomous vehicle 10 and/or computing system 108 can generate (e.g., based at least in part on the determined current state of the trip, and/or the like) data describing one or more interfaces (e.g., additional, updated, and/or the like interfaces) for display by computing device(s) 202 and/or 206 and can communicate such data to computing device(s) 202 and/or 206, which can receive the data and can utilize the data to render the interface(s) for display (e.g., to the passenger, and/or the like). For example, at (368A), autonomous vehicle 10 (e.g., computing system 102, computing device(s) 104 and/or 202, and/or the like) can generate data describing such interface(s) and can communicate such data to computing device 206, which can receive the data. Additionally or alternatively, at (368B), computing system 108 can generate data describing such interface(s) and can communicate such data to computing device 206, which can receive the data. For example, referring to FIG. 4M, autonomous vehicle 10 and/or computing system 108 can generate, for example, in accordance with one or more parameters of computing device 206 (e.g., display size, input capabilities, operating system, and/or the like), data describing interface 426 for display by computing device 206 and can communicate such data to computing device 206, which can receive the data. As illustrated, interface 426 can include element 436 indicating the determined current state of the trip (e.g., the state corresponding to autonomous vehicle 10 approaching the destination of the trip, and/or the like) and/or element 438 graphically depicting progress of the trip (e.g., from the location of the passenger, the pickup location for the passenger, and/or the like to the destination, and/or the like).

Figure 4N:
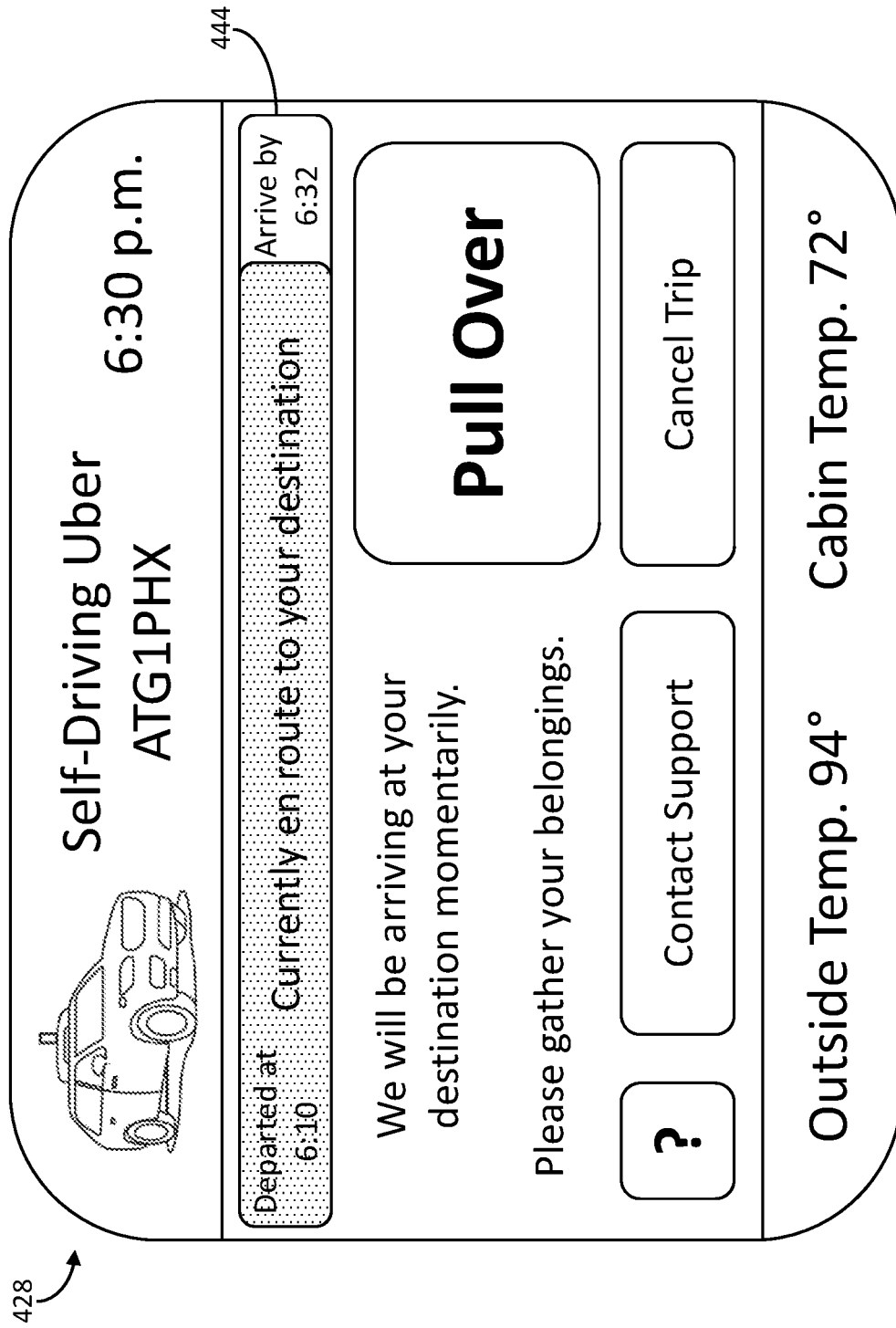
Figure 40:
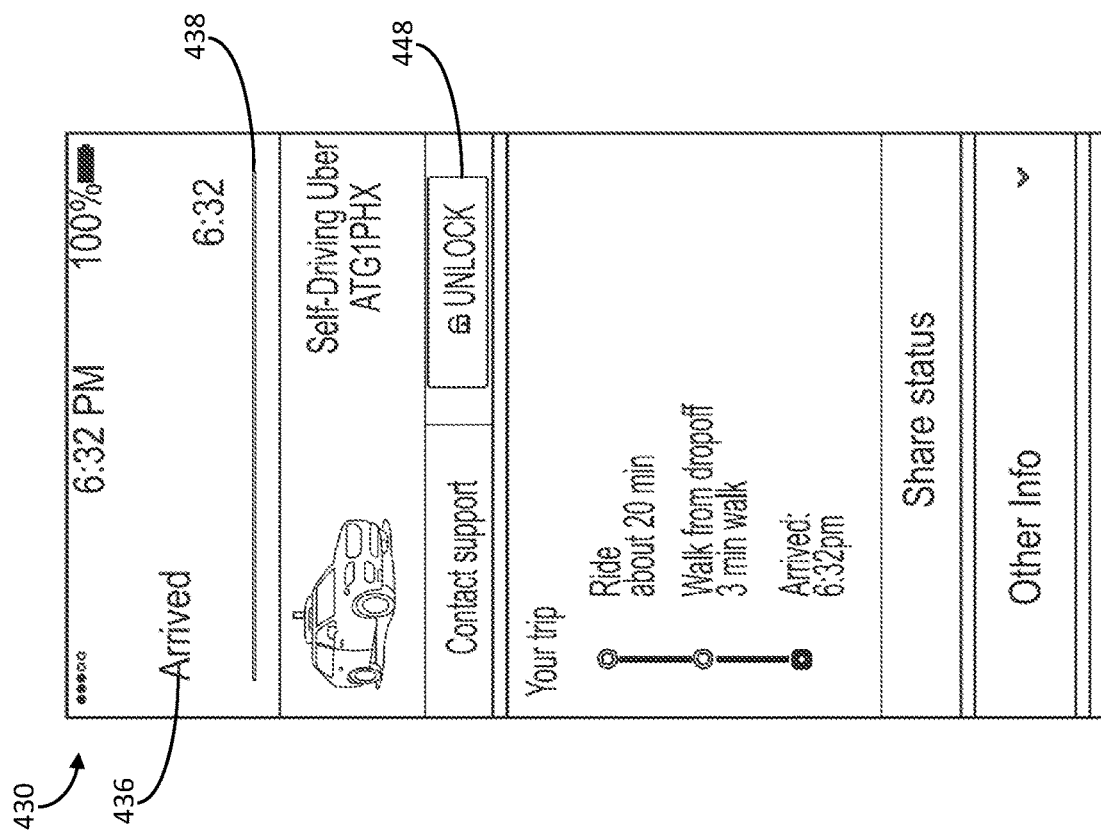

Returning to FIG. 3D, additionally or alternatively, at (368C), autonomous vehicle 10 (e.g., computing system 102, computing device(s) 104 and/or 202, and/or the like) can generate data describing such interface(s) and can communicate such data to computing device 202, which can receive the data. For example, referring to FIG. 4N, autonomous vehicle 10 can generate, for example, in accordance with one or more parameters of computing device 202 (e.g., display size, input capabilities, operating system, and/or the like), data describing interface 428 for display by computing device 202 and can communicate such data to computing device 202, which can receive the data. As illustrated, interface 428 can include element 444 indicating the determined current state of the trip (e.g., the state corresponding to autonomous vehicle 10 approaching the destination of the trip, and/or the like) and/or graphically depicting progress of the trip (e.g., from the location of the passenger, the pickup location for the passenger, and/or the like to the destination, and/or the like).

Returning to FIG. 3D, at (370), autonomous vehicle 10 can adjust (e.g., based at least in part on the determined current state of the trip, and/or the like) one or more parameters of autonomous vehicle 10. For example, based at least in part on a determination that the current state of the trip corresponds to autonomous vehicle 10 approaching the destination of the trip, and/or the like, autonomous vehicle 10 can adjust the parameter(s) such that lighting inside autonomous vehicle 10, audio inside autonomous vehicle 10, video inside autonomous vehicle 10, and/or the like signals to the passenger that the destination is being approached, and/or the like.

At (372), autonomous vehicle 10 can generate data indicating a current location of autonomous vehicle 10 and can communicate such data to computing system 108, which can receive the data.

At (374), autonomous vehicle 10 and/or computing system 108 can determine a current state of the trip from amongst the various predefined, finite, and distinct states. For example, at (374A), autonomous vehicle 10 (e.g., computing system 102, computing device(s) 104 and/or 202, and/or the like) can determine that the current state of the trip is a state corresponding to autonomous vehicle 10 having arrived at the destination of the trip. Such a state can be characterized by arrival of autonomous vehicle 10 at the destination of the trip, the passenger being located inside autonomous vehicle 10, and/or the like.

Additionally or alternatively, at (374B), computing system 108 can determine that the current state of the trip is the state corresponding to autonomous vehicle 10 having arrived at the destination of the trip. For example, computing system 108 can determine (e.g., based at least in part on the data received at (372), and/or the like) that autonomous vehicle 10 has arrived at the destination of the trip, and/or the like.

At (376), autonomous vehicle 10 and/or computing system 108 can identify (e.g., based at least in part on the determined current state of the trip, and/or the like) computing device(s) 202 and/or 206 as being associated with the passenger (e.g., being presently viewable by the passenger, and/or the like). For example, at (376A), autonomous vehicle 10 (e.g., computing system 102, computing device(s) 104 and/or 202, and/or the like) can identify computing device(s) 202 and/or 206 based at least in part on the determined current state of the trip indicating the passenger is located inside autonomous vehicle 10, establishment of the communication session via link 204 between autonomous vehicle 10 and computing device 206, data communicated via the communication session, a strength of a signal associated with the communication session, and/or the like. Additionally or alternatively, at (376B), computing system 108 can identify computing device(s) 202 and/or 206 based at least in part on the determined current state of the trip indicating the passenger is located inside autonomous vehicle 10, information included in the request received from computing device 206, and/or the like.

At (378), autonomous vehicle 10 and/or computing system 108 can generate (e.g., based at least in part on the determined current state of the trip, and/or the like) data describing one or more interfaces (e.g., additional, updated, and/or the like interfaces) for display by computing device(s) 202 and/or 206 and can communicate such data to computing device(s) 202 and/or 206, which can receive the data and can utilize the data to render the interface(s) for display (e.g., to the passenger, and/or the like). For example, at (378A), autonomous vehicle 10 (e.g., computing system 102, computing device(s) 104 and/or 202, and/or the like) can generate data describing such interface(s) and can communicate such data to computing device 206, which can receive the data. Additionally or alternatively, at (378B), computing system 108 can generate data describing such interface(s) and can communicate such data to computing device 206, which can receive the data. For example, referring to FIG. 4O, autonomous vehicle 10 and/or computing system 108 can generate, for example, in accordance with one or more parameters of computing device 206 (e.g., display size, input capabilities, operating system, and/or the like), data describing interface 430 for display by computing device 206 and can communicate such data to computing device 206, which can receive the data. As illustrated, interface 430 can include element 436 indicating the determined current state of the trip (e.g., the state corresponding to autonomous vehicle 10 having arrived at the destination of the trip, and/or the like), element 438 graphically depicting progress of the trip (e.g., from the location of the passenger, the pickup location for the passenger, and/or the like to the destination, and/or the like), element 448 for enabling the passenger to unlock one or more doors of autonomous vehicle 10, and/or the like.

Figure 3E:
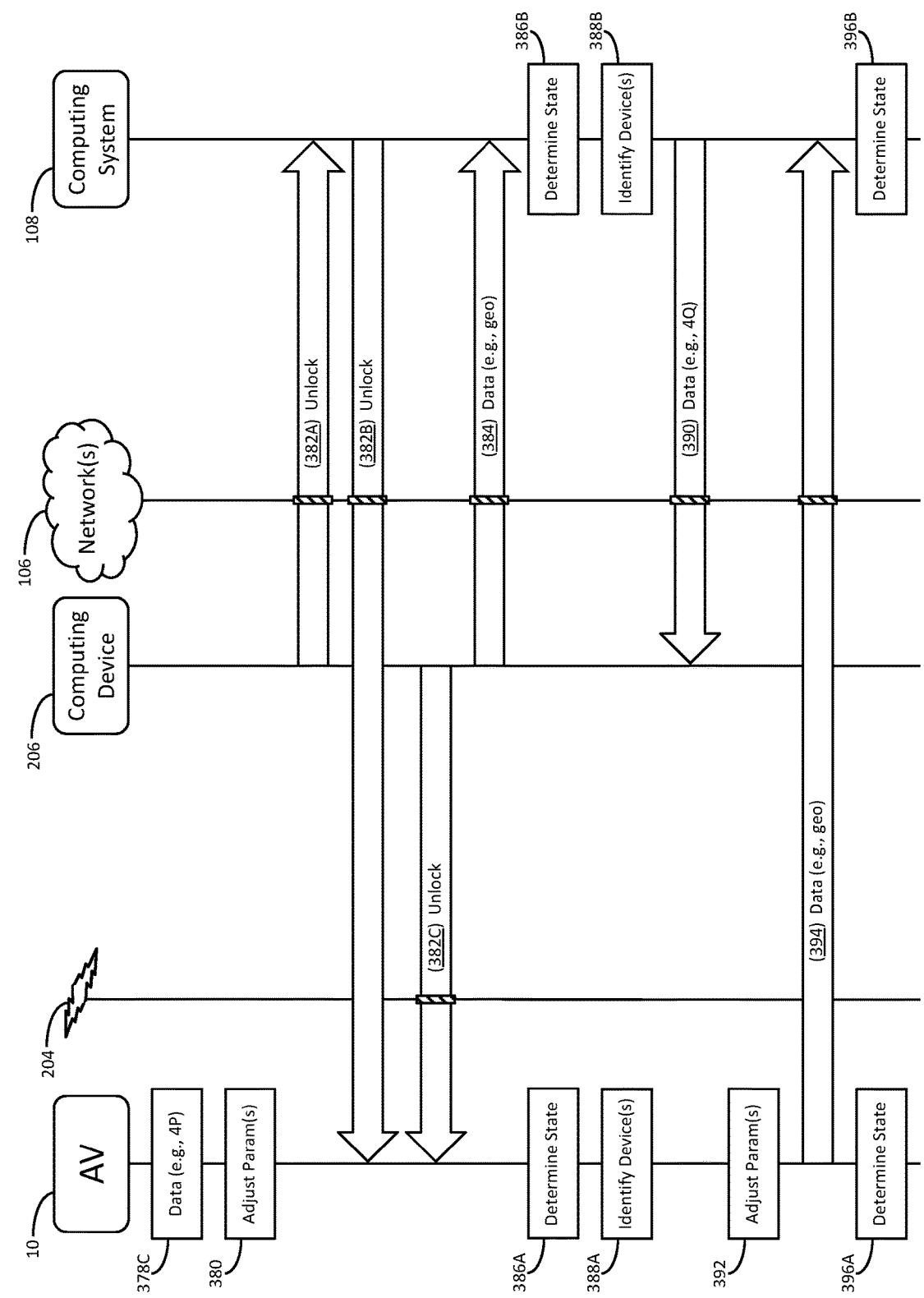
Figure 4P:
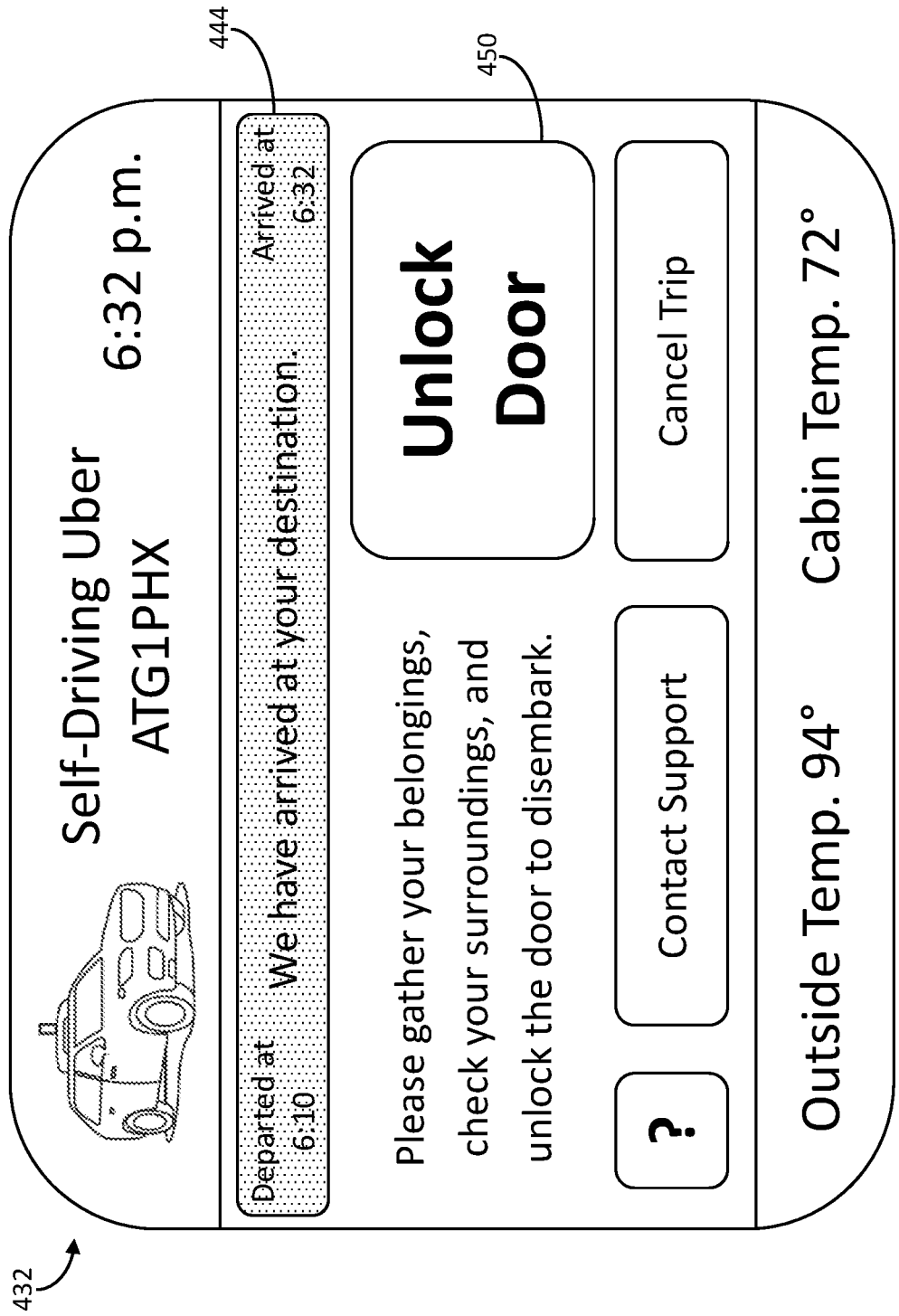

Referring to FIG. 3E, additionally or alternatively, at (378C), autonomous vehicle 10 (e.g., computing system 102, computing device(s) 104 and/or 202, and/or the like) can generate data describing such interface(s) and can communicate such data to computing device 202, which can receive the data. For example, referring to FIG. 4P, autonomous vehicle 10 can generate, for example, in accordance with one or more parameters of computing device 202 (e.g., display size, input capabilities, operating system, and/or the like), data describing interface 432 for display by computing device 202 and can communicate such data to computing device 202, which can receive the data. As illustrated, interface 432 can include element 444 indicating the determined current state of the trip (e.g., the state corresponding to autonomous vehicle 10 having arrived at the destination of the trip, and/or the like) and/or graphically depicting progress of the trip (e.g., from the location of the passenger, the pickup location for the passenger, and/or the like to the destination, and/or the like), element 450 for enabling the passenger to unlock one or more doors of autonomous vehicle 10, and/or the like.

In some embodiments, autonomous vehicle 10 and/or computing system 108 can determine (e.g., based at least in part on the determined current state of the trip, and/or the like) a next state of the trip from amongst the various states. For example, autonomous vehicle 10 and/or computing system 108 can determine (e.g., based at least in part on the determined current state of the trip, and/or the like) that a next state of the trip is a state corresponding to the passenger departing from autonomous vehicle 10. Such a state can be characterized by arrival of autonomous vehicle 10 at the destination of the trip, the passenger being located outside autonomous vehicle 10, and/or the like.

In some of such embodiments, the interface(s) can prompt the passenger to take one or more actions to transition from the current state of the trip to the next state of the trip. The action(s) can correspond to one or more functions of autonomous vehicle 10 upon which the next state depends, and/or the like. For example, the state corresponding to the passenger departing from autonomous vehicle 10 can depend on the passenger invoking element(s) 448 and/or 450, interface(s) 430 and/or 432 can prompt the passenger to take one or more actions (e.g., invoke element(s) 448 and/or 450, and/or the like) to transition from the current state of the trip to the next state of the trip, and/or the like. Additionally or alternatively, autonomous vehicle 10 (e.g., computing system 102, computing device(s) 104 and/or 202, and/or the like) and/or computing system 108 can cause autonomous vehicle 10 to produce audio prompting the passenger to take such action(s).

Returning to FIG. 3E, at (380), autonomous vehicle 10 can adjust (e.g., based at least in part on the determined current state of the trip, and/or the like) one or more parameters of autonomous vehicle 10. For example, based at least in part on a determination that the current state of the trip corresponds to autonomous vehicle 10 having arrived at the destination of the trip, and/or the like, autonomous vehicle 10 can adjust the parameter(s) such that lighting inside autonomous vehicle 10 accommodates the passenger exiting autonomous vehicle 10, and/or the like.

At (382), the passenger can take (e.g., in response to the prompt(s), and/or the like) the action(s) to transition from the current state of the trip to the next state of the trip. For example, the passenger can invoke a function to unlock one or more doors of autonomous vehicle 10 (e.g., by invoking element(s) 448 and/or 450, and/or the like). In some embodiments, responsive to the action(s), at (382A), computing device 206 can generate data indicating the action(s) and can communicate such data to computing system 108, which can receive the data and responsive to receiving the data, at (382B), can generate data indicating the action(s) and can communicate such data to autonomous vehicle 10, which can receive the data and responsive to receiving the data, can perform the function (e.g., unlock the door(s), and/or the like). Additionally or alternatively, responsive to the action(s), at (382C), computing device 206 can generate data indicating the action(s) and can communicate such data to autonomous vehicle 10, which can receive the data and responsive to receiving the data, can perform the function (e.g., unlock the door(s), and/or the like).

At (384), computing device 206 can generate, for example, based at least in part on one or more signals (e.g., global positioning system (GPS) signals, wireless network signals, and/or the like) received by computing device 206, data indicating the current location of the passenger and can communicate such data to computing system 108, which can receive the data.

At (386), autonomous vehicle 10 and/or computing system 108 can determine a current state of the trip from amongst the various predefined, finite, and distinct states. For example, at (386A), autonomous vehicle 10 (e.g., computing system 102, computing device(s) 104 and/or 202, and/or the like) can determine that the current state of the trip is a state corresponding to autonomous vehicle 10 departing the destination of the trip. Such a state can be characterized by the passenger being located outside autonomous vehicle 10, proximity of autonomous vehicle 10 to the destination of the trip, locomotion of autonomous vehicle 10 along a route from the destination of the trip to a new, different location, and/or the like.

Additionally or alternatively, at (386B), computing system 108 can determine that the current state of the trip is the state corresponding to autonomous vehicle 10 departing the destination of the trip. For example, computing system 108 can determine (e.g., based at least in part on the data received at (382) and/or (384), and/or the like) that the passenger is located outside autonomous vehicle 10, autonomous vehicle 10 is departing the destination of the trip, and/or the like.

At (388), autonomous vehicle 10 and/or computing system 108 can identify (e.g., based at least in part on the determined current state of the trip, and/or the like) computing device 206 as being associated with the passenger (e.g., being presently viewable by the passenger, and/or the like). For example, at (388A), autonomous vehicle 10 (e.g., computing system 102, computing device(s) 104 and/or 202, and/or the like) can identify computing device 206 based at least in part on the determined current state of the trip indicating the passenger is located outside autonomous vehicle 10, interruption of the communication session via link 204 between autonomous vehicle 10 and computing device 206, data communicated via the communication session, a strength of a signal associated with the communication session, and/or the like. Additionally or alternatively, at (388B), computing system 108 can identify computing device 206 based at least in part on the determined current state of the trip indicating the passenger is located outside autonomous vehicle 10, information included in the request received from computing device 206, and/or the like.

Figure 4Q:
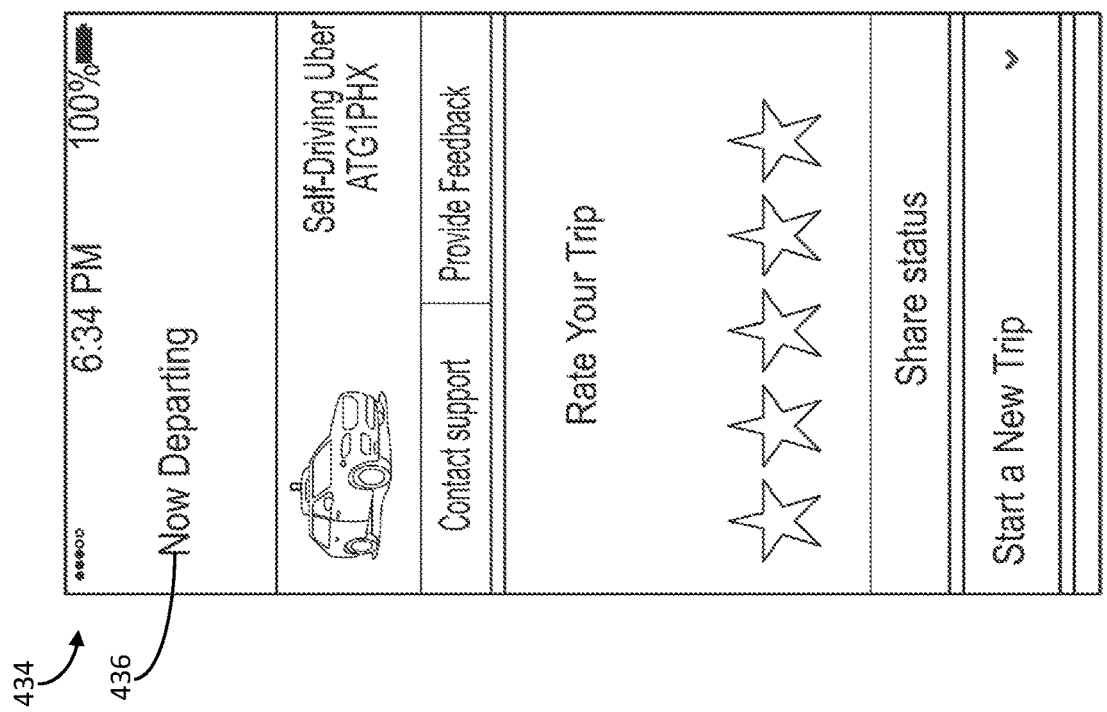

At (390), computing system 108 can generate (e.g., based at least in part on the determined current state of the trip, and/or the like) data describing one or more interfaces (e.g., additional, updated, and/or the like interfaces) for display by computing device 206 and can communicate such data to computing device 206, which can receive the data and can utilize the data to render the interface(s) for display (e.g., to the passenger, and/or the like). For example, referring to FIG. 4Q, computing system 108 can generate, for example, in accordance with one or more parameters of computing device 206 (e.g., display size, input capabilities, operating system, and/or the like), data describing interface 434 for display by computing device 206 and can communicate such data to computing device 206, which can receive the data. As illustrated, interface 434 can include element 436 indicating the determined current state of the trip (e.g., the state corresponding to autonomous vehicle 10 departing the destination of the trip, and/or the like).

Returning to FIG. 3E, at (392), autonomous vehicle 10 can adjust (e.g., based at least in part on the determined current state of the trip, and/or the like) one or more parameters of autonomous vehicle 10. In some embodiments, one or more default preferences can be associated with autonomous vehicle 10. In some of such embodiments, autonomous vehicle 10 can adjust, maintain, and/or the like the parameter(s) based at least in part on the default preference(s), the determined current state of the trip, and/or the like. For example, responsive to determining that the current state of the trip corresponds to autonomous vehicle 10 departing and/or having departed the destination of the trip, autonomous vehicle 10 can adjust, maintain, and/or the like the parameter(s) such that audio, video, climate and/or the like inside autonomous vehicle 10 are in accordance with the default preference(s).

At (394), autonomous vehicle 10 can generate data indicating a current location of autonomous vehicle 10 and can communicate such data to computing system 108, which can receive the data.

At (396), autonomous vehicle 10 and/or computing system 108 can determine a current state of the trip from amongst the various predefined, finite, and distinct states. For example, at (396A), autonomous vehicle 10 (e.g., computing system 102, computing device(s) 104 and/or 202, and/or the like) can determine that the current state of the trip is a state corresponding to autonomous vehicle 10 having departed the destination of the trip. Such a state can be characterized by the passenger being located outside autonomous vehicle 10, locomotion of autonomous vehicle 10 along the route from the destination of the trip to the new, different location, and/or the like.

Additionally or alternatively, at (396B), computing system 108 can determine that the current state of the trip is the state corresponding to autonomous vehicle 10 having departed the destination of the trip. For example, computing system 108 can determine (e.g., based at least in part on the data received at (394), and/or the like) that autonomous vehicle 10 has departed the destination of the trip, and/or the like.

FIG. 5 depicts an example method according to example embodiments of the present disclosure. Referring to FIG. 5, at (502), a computing system can determine, based at least in part on one or more actions of a passenger associated with a trip of an autonomous vehicle, a current state of the trip from amongst a plurality of different predefined states of the trip. For example, autonomous vehicle 10 (e.g., computing system 102, computing device(s) 104 and/or 202, and/or the like) and/or computing system 108 can determine that the current state of the trip is the state corresponding to the passenger and autonomous vehicle 10 being en route to the destination of the trip. At (504), the computing system can identify, based at least in part on the current state of the trip, one or more computing devices associated with the passenger. For example, autonomous vehicle 10 (e.g., computing system 102, computing device(s) 104 and/or 202, and/or the like) and/or computing system 108 can identify computing device(s) 202 and/or 206. At (506), the computing system can generate, based at least in part on the current state of the trip, data describing one or more interfaces for display by the computing device(s) associated with the passenger. For example, autonomous vehicle 10 (e.g., computing system 102, computing device(s) 104 and/or 202, and/or the like) and/or computing system 108 can generate data describing interface(s) 422 and/or 424 for display by computing device(s) 202 and/or 206. At (508), the computing system can communicate, to the computing device(s) associated with the passenger, the data describing the interface(s) for display. For example, autonomous vehicle 10 (e.g., computing system 102, computing device(s) 104 and/or 202, and/or the like) and/or computing system 108 can communicate, to computing device(s) 202 and/or 206, the data describing interface(s) 422 and/or 424 for display by computing device(s) 202 and/or 206.

The technology discussed herein makes reference to servers, databases, software applications, and/or other computer-based systems, as well as actions taken and information sent to and/or from such systems. The inherent flexibility of computer-based systems allows for a great variety of possible configurations, combinations, and/or divisions of tasks and/or functionality between and/or among components. For instance, processes discussed herein can be implemented using a single device or component and/or multiple devices or components working in combination. Databases and/or applications can be implemented on a single system and/or distributed across multiple systems. Distributed components can operate sequentially and/or in parallel.

Various connections between elements are discussed in the above description. These connections are general and, unless specified otherwise, can be direct and/or indirect, wired and/or wireless. In this respect, the specification is not intended to be limiting.

The depicted and/or described steps are merely illustrative and can be omitted, combined, and/or performed in an order other than that depicted and/or described; the numbering of depicted steps is merely for ease of reference and does not imply any particular ordering is necessary or preferred.

The functions and/or steps described herein can be embodied in computer-usable data and/or computer-executable instructions, executed by one or more computers and/or other devices to perform one or more functions described herein. Generally, such data and/or instructions include routines, programs, objects, components, data structures, or the like that perform particular tasks and/or implement particular data types when executed by one or more processors in a computer and/or other data-processing device. The computer-executable instructions can be stored on a computer-readable medium such as a hard disk, optical disk, removable storage media, solid-state memory, read-only memory (RAM), or the like. As will be appreciated, the functionality of such instructions can be combined and/or distributed as desired. In addition, the functionality can be embodied in whole or in part in firmware and/or hardware equivalents, such as integrated circuits, application-specific integrated circuits (ASICs), field-programmable gate arrays (FPGAs), or the like. Particular data structures can be used to more effectively implement one or more aspects of the disclosure, and such data structures are contemplated to be within the scope of computer-executable instructions and/or computer-usable data described herein.

Although not required, one of ordinary skill in the art will appreciate that various aspects described herein can be embodied as a method, system, apparatus, and/or one or more computer-readable media storing computer-executable instructions. Accordingly, aspects can take the form of an entirely hardware embodiment, an entirely software embodiment, an entirely firmware embodiment, and/or an embodiment combining software, hardware, and/or firmware aspects in any combination.

As described herein, the various methods and acts can be operative across one or more computing devices and/or networks. The functionality can be distributed in any manner or can be located in a single computing device (e.g., server, client computer, user device, or the like).

Aspects of the disclosure have been described in terms of illustrative embodiments thereof. Numerous other embodiments, modifications, and/or variations within the scope and spirit of the appended claims can occur to persons of ordinary skill in the art from a review of this disclosure. For example, one or ordinary skill in the art can appreciate that the steps depicted and/or described can be performed in other than the recited order and/or that one or more illustrated steps can be optional and/or combined. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A system comprising:
   at least one hardware processor; and
   a memory storing instructions that when executed by the at least one hardware processor cause the system to perform operations comprising:
   determining a current state of a trip executed for a user by an autonomous vehicle from amongst a plurality of different predefined states of the trip;
   identifying a computing device associated with the user;
   receiving, from the computing device associated with the user, a request to transition the trip from the current state of the trip to a second state of the trip; and
   responsive to receiving the request, causing the autonomous vehicle to perform at least one action associated with the second state of the trip.

2. The system of claim 1, the at least one action associated with the second state of the trip comprising unlocking the autonomous vehicle.

3. The system of claim 1, the identifying the computing device associated with the user comprising identifying a computing device distinct from the autonomous vehicle and possessed by the user while the user is located outside the autonomous vehicle.

4. The system of claim 1, the operations further comprising:
   generating data describing an interface for display by the computing device associated with the user; and
   communicating the data describing the interface to the computing device associated with the user.

5. The system of claim 1, the determining the current state of the trip comprising determining, based at least in part on data received from the computing device associated with the user, that the user is located outside the autonomous vehicle.

6. The system of claim 5, the operations further comprising:
   determining, based at least in part on the data received from the computing device associated with the user, a geographic location of the user;
   determining, based at least in part on the geographic location of the user, a proximity of the user to the autonomous vehicle; and
   determining, based at least in part on the proximity of the user to the autonomous vehicle, that the user is located outside the autonomous vehicle.

7. The system of claim 1, the operations further comprising:
   generating data describing an interface for display by the computing device associated with the user; and
   communicating, to the computing device associated with the user, at least a portion of the data describing the interface for display by the computing device associated with the user while the user is located inside the autonomous vehicle.

8. The system of claim 1, the operations further comprising determining a next current state of the autonomous vehicle based at least in part on at least one physical interaction between the user and the autonomous vehicle.

9. The system of claim 8, the operations further comprising detecting the at least one physical interaction between the user and the autonomous vehicle based at least in part on data generated by at least one of:
   a door sensor of the autonomous vehicle;
   a seat-pressure sensor of the autonomous vehicle;
   a seatbelt sensor of the autonomous vehicle;
   a camera of the autonomous vehicle located outside the autonomous vehicle;
   a camera of the autonomous vehicle located inside the autonomous vehicle;
   a thermal sensor of the autonomous vehicle located outside the autonomous vehicle; or
   a thermal sensor of the autonomous vehicle located inside the autonomous vehicle.

10. The system of claim 8, the operations further comprising establishing, in accordance with a short-range wireless-communication protocol, a communication session between a computing device physically located onboard the autonomous vehicle and the computing device associated with the user, the determining of the next current state of the trip being based at least in part on one or more of:
    establishment of the communication session,
    data communicated via the communication session, or
    a strength of a signal associated with the communication session.

11. A computer-implemented method comprising:
    determining, by a computing system, a current state of a trip executed for a user by an autonomous vehicle from amongst a plurality of different predefined states of the trip;
    identifying, by the computing system, a computing device associated with the user;

receiving, by the computing system and from the computing device associated with the user, a request to transition the trip from the current state of the trip to a second state of the trip; and responsive to receiving the request, causing, by the computing system, the autonomous vehicle to perform at least one action associated with the second state of the trip.

12. The computer-implemented method of claim 11, the at least one action associated with the second state of the trip comprising unlocking the autonomous vehicle.

13. The computer-implemented method of claim 11, the identifying the computing device associated with the user comprising identifying a computing device distinct from the autonomous vehicle and possessed by the user while the user is located outside the autonomous vehicle.

14. The computer-implemented method of claim 13, further comprising:

generating data describing an interface for display by the computing device associated with the user; and communicating the data describing the interface to the computing device associated with the user.

15. The computer-implemented method of claim 11, the determining the current state of the trip comprising determining, based at least in part on data received from the computing device associated with the user, that the user is located outside the autonomous vehicle.

16. The computer-implemented method of claim 15, further comprising:

determining, based at least in part on the data received from the computing device associated with the user, a geographic location of the user;

determining, based at least in part on the geographic location of the user, a proximity of the user to the autonomous vehicle; and determining, based at least in part on the proximity of the user to the autonomous vehicle, that the user is located outside the autonomous vehicle.

17. The computer-implemented method of claim 11, further comprising:

generating data describing an interface for display by the computing device associated with the user; and communicating, to the computing device associated with the user, at least a portion of the data describing the interface for display by the computing device associated with the user while the user is located inside the autonomous vehicle.

18. The computer-implemented method of claim 11, further comprising determining a next current state of the autonomous vehicle based at least in part on at least one physical interaction between the user and the autonomous vehicle.

19. The computer-implemented method of claim 18, further comprising detecting, by the computing system, the at least one physical interaction between the user and the autonomous vehicle based at least in part on data generated by at least one of:

a door sensor of the autonomous vehicle;

a seat-pressure sensor of the autonomous vehicle;

a seatbelt sensor of the autonomous vehicle;

a camera of the autonomous vehicle located outside the autonomous vehicle;

a camera of the autonomous vehicle located inside the autonomous vehicle;

a thermal sensor of the autonomous vehicle located outside the autonomous vehicle; or a thermal sensor of the autonomous vehicle located inside the autonomous vehicle.

20. At least one non-transitory computer-readable medium comprising instructions that, when executed by one or more computers, cause the one or more computers to perform operations comprising:

determining a current state of a trip executed for a user by an autonomous vehicle from amongst a plurality of different predefined states of the trip;

identifying a computing device associated with the user;

receiving, from the computing device associated with the user, a request to transition the trip from the current state of the trip to a second state of the trip; and responsive to receiving the request, causing the autonomous vehicle to perform at least one action associated with the second state of the trip.

* * * * *